INVENTORS R. A. MILLER
C. A. NICKERSON
C. M. TARIS
BY V. P. Griolo
ATTORNEY

Dec. 30, 1958 R. A. MILLER ET AL 2,866,852

AUTOMATIC TELEPHONE ANSWERING AND MESSAGE-RECORDING SYSTEM

Filed May 29, 1956 21 Sheets-Sheet 2

INVENTORS R. A. MILLER C. A. NICKERSON C. M. TARIS

BY V. P. Triolo

ATTORNEY

AUTOMATIC TELEPHONE ANSWERING AND MESSAGE-RECORDING SYSTEM

Filed May 29, 1956 21 Sheets-Sheet 3

INVENTORS R. A. MILLER
C. A. NICKERSON
C. M. TARIS

BY V. P. Triolo
ATTORNEY

INVENTORS R. A. MILLER
C. A. NICKERSON
C. M. TARIS
BY V. P. Friolo
ATTORNEY

AUTOMATIC TELEPHONE ANSWERING AND MESSAGE-RECORDING SYSTEM

Filed May 29, 1956 21 Sheets-Sheet 5

INVENTORS R. A. MILLER
C. A. NICKERSON
C. M. TARIS
BY V. P. Griolo
ATTORNEY

AUTOMATIC TELEPHONE ANSWERING AND MESSAGE-RECORDING SYSTEM

INVENTORS R. A. MILLER
C. A. NICKERSON
C. M. TARIS
BY V. P. Nicols
ATTORNEY

AUTOMATIC TELEPHONE ANSWERING AND MESSAGE-RECORDING SYSTEM

INVENTORS R. A. MILLER
C. A. NICKERSON
C. M. TARIS
BY V. P. Sriolo
ATTORNEY

Dec. 30, 1958 R. A. MILLER ET AL 2,866,852

AUTOMATIC TELEPHONE ANSWERING AND MESSAGE-RECORDING SYSTEM

Filed May 29, 1956 21 Sheets-Sheet 8

INVENTORS R. A. MILLER
C. A. NICKERSON
C. M. TARIS

BY V. P. Friolo

ATTORNEY

INVENTORS R. A. MILLER
C. A. NICKERSON
C. M. TARIS
BY
V. P. Iriolo
ATTORNEY

INVENTORS R. A. MILLER
C. A. NICKERSON
C. M. TARIS
BY V. P. Sriolo
ATTORNEY

INVENTORS R. A. MILLER
C. A. NICKERSON
C. M. TARIS
BY
V. P. Triolo
ATTORNEY

INVENTORS R. A. MILLER
C. A. NICKERSON
C. M. TARIS
BY V. P. Triolo
ATTORNEY

AUTOMATIC TELEPHONE ANSWERING AND MESSAGE-RECORDING SYSTEM

Filed May 29, 1956 21 Sheets-Sheet 13

INVENTORS R. A. MILLER
C. A. NICKERSON
C. M. TARIS
BY V. P. Sriolo
ATTORNEY

Dec. 30, 1958 R. A. MILLER ET AL 2,866,852

AUTOMATIC TELEPHONE ANSWERING AND MESSAGE-RECORDING SYSTEM

Filed May 29, 1956 21 Sheets-Sheet 14

INVENTORS R. A. MILLER
C. A. NICKERSON
C. M. TARIS

BY

ATTORNEY

AUTOMATIC TELEPHONE ANSWERING AND MESSAGE-RECORDING SYSTEM

Filed May 29, 1956 21 Sheets-Sheet 15

INVENTORS R. A. MILLER
C. A. NICKERSON
C. M. TARIS
BY
V. P. Triolo
ATTORNEY

INVENTORS R. A. MILLER
C. A. NICKERSON
C. M. TARIS
BY V. P. Triolo
ATTORNEY

Dec. 30, 1958 R. A. MILLER ET AL 2,866,852

AUTOMATIC TELEPHONE ANSWERING AND MESSAGE-RECORDING SYSTEM

Filed May 29, 1956 21 Sheets-Sheet 17

INVENTORS R. A. MILLER
C. A. NICKERSON
C. M. TARIS

BY V. P. Friolo

ATTORNEY

INVENTORS R. A. MILLER
C. A. NICKERSON
C. M. TARIS
BY V. P. Triolo
ATTORNEY

INVENTORS R. A. MILLER
C. A. NICKERSON
C. M. TARIS
BY V. P. Friolo
ATTORNEY

AUTOMATIC TELEPHONE ANSWERING AND MESSAGE-RECORDING SYSTEM

INVENTORS R. A. MILLER
C. A. NICKERSON
C. M. TARIS
BY V. P. Sriolo
ATTORNEY

INVENTORS R. A. MILLER
C. A. NICKERSON
C. M. TARIS
BY
V. P. Triolo
ATTORNEY 2,866,852
Patented Dec. 30, 1958

2,866,852

AUTOMATIC TELEPHONE ANSWERING AND MESSAGE-RECORDING SYSTEM

Robert A. Miller, Plainfield, Clifford A. Nickerson, Bernardsville, and Charles M. Taris, Cranford, N. J., assignors to Bell Telephone Laboratories, Incorporated, New York, N. Y., a corporation of New York Application May 29, 1956, Serial No. 588,010

19 Claims. (Cl. 179—6)

This invention relates to automatic telephone answering and message-recording systems comprising a device adapted to be connected to a subscriber's telephone line for the purpose of automatically receiving and transmitting messages during the absence of the subscriber, and particularly to systems of this type which comprise facilities for providing playback and erasure of the incoming message record under subscriber control from a distant station.

An object of this invention is to provide a telephone answering and message-recording system which will not only include facilities for the playback by the subcriber of the incoming message record at the station in which the answering and recording device is located, but will also include facilities for the playback of the incoming message record under subscriber control from a remote or distant station.

Another object of this invention is to provide a telephone answering and message-recording system which includes facilities for controlling the erasure of the incoming message record from a remote station as well as at the station in which the answering and recording device is located.

A further object of this invention is to provide a telephone answering and message-recording system which includes facilities for playing back, on calls subsequent to the first call by the subscriber from a remote station, the incoming message record from the point of recording last heard by the subscriber rather than from the beginning of the first message.

The embodiment of this invention shown in the drawings described hereinafter includes certain features (such as the facility responsive to calling party disconnect) which are also included in the system disclosed in patent application Serial No. 331,157, filed by C. R. Keith and C. A. Nickerson on January 14, 1953.

In accordance with this invention, the above-noted objectives are satisfactorily met by a unitary device suitable for use on a desk or table, the general features of which include the utilization of magnetic recording for both the transmitted and received messages. These messages are recorded on two individual drums mounted on the same shaft but not connected directly to it.

Each drum is provided with an electromagnetic transducer which travels axially along the surface of the magnetizable record medium disposed on the peripheral surface of the drum by means of a half-nut which engages a lead screw, causing a helical track to be laid down on the medium. In order to ensure that the track be retraced, the lead screw is driven by the drum through constantly meshed gears which guarantee the maintenance of the orientation of the drum with respect to the lead screw. The two drums are assembled on the shaft on bearings contained in the drum and each drum is driven from the shaft by means of a constant torque clutch. This arrangement permits the driving of either drum separately or jointly and is utilized to hold the incoming message-recording drum stationary during both the record and reproduce cycles of the answering message drum and to hold the answering message drum stationary during both the record and reproduce cycles of the incoming message drum. Rotation of the drums is prevented by means of a control circuit responsive pawl which falls into a notch in the drum.

The carriage supporting the incoming message transducer is returned manually to its initial position for the purpose of playing back the incoming messages at the station in which the device is located. It is power driven by a separate motor under the control of the subscriber to accomplish the playback function from a distant or remote station. Erasure of the incoming message record may also be accomplished from a remote station. In the particular embodiment of the invention shown in the drawings, a two-party telephone line is used to accomplish the functions of playback and erase from a remote station, one of the two-party line numbers being used for the playback function, the other for the erase function.

By means of a "playback index" carriage which is associated with the carriage supporting the incoming message transducer, the transducer supporting carriage may, on calls subsequent to the first call from the remote station, be made to return to the point of recording last heard rather than to the beginning of the first message or any intermediate point. The "playback index" carriage, which is driven by the transducer carriage during playback, may be released from the control exercised by the transducer carriage, by the subscriber, from the remote station, through the calling party disconnect facility which is also used to stop the rotation of the drums and to shut down the machine after the calling party hangs up if this occurs before the end of the maximum message period.

The nature of the invention and its distinguishing features and advantages will be more clearly understood from the following detailed description and the accompanying drawings in which.

Figure 32:
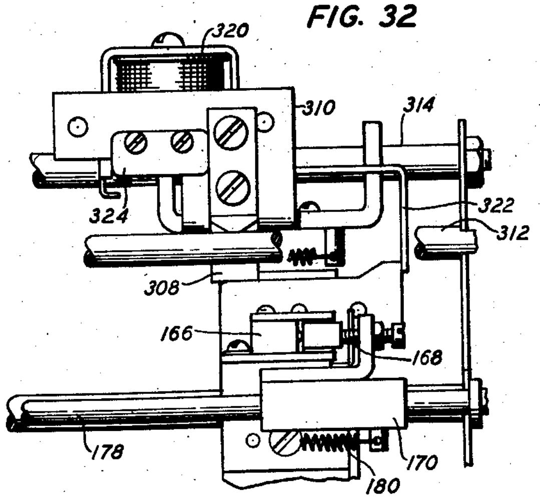
Figure 35:
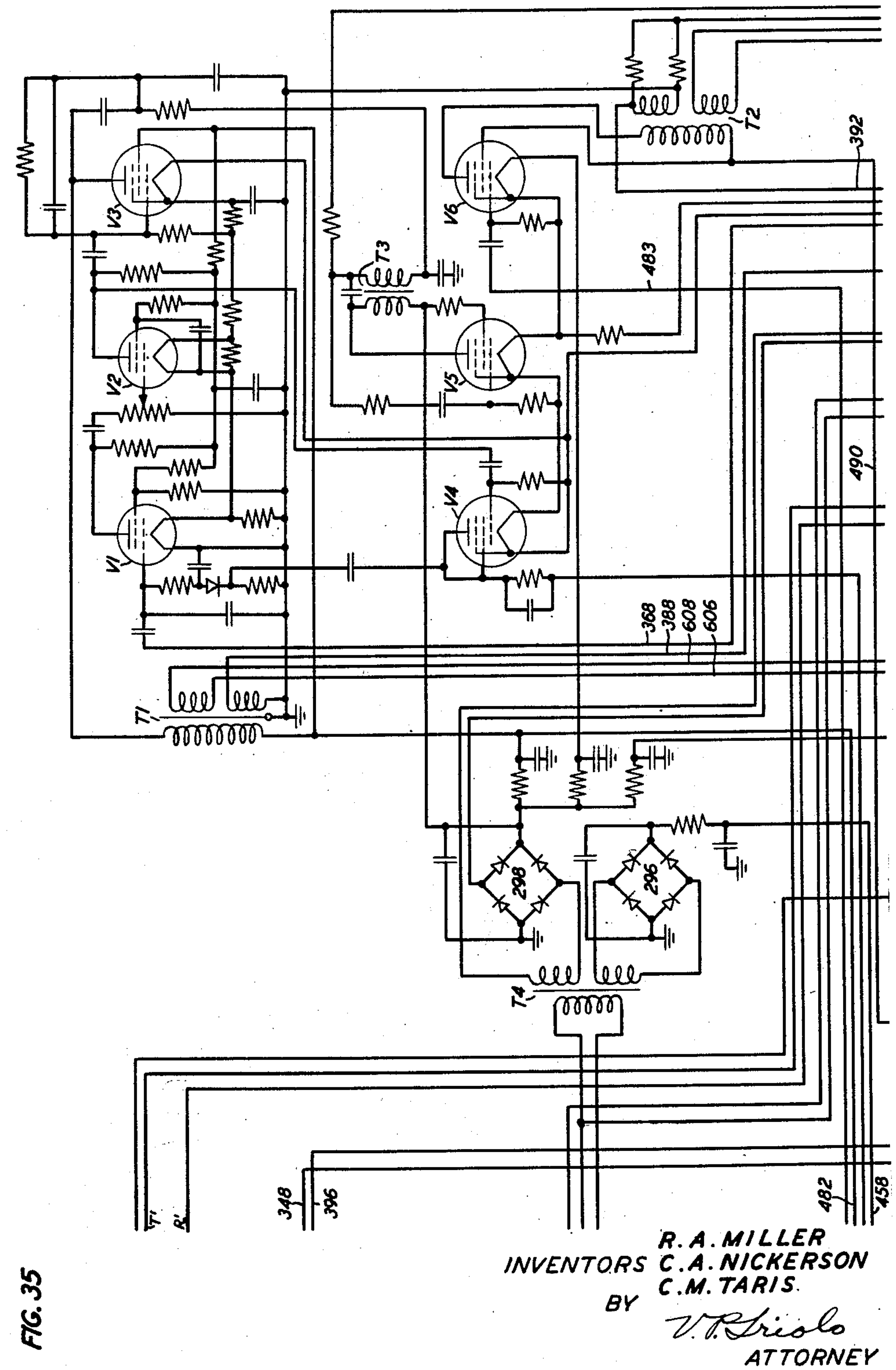
Figure 36:
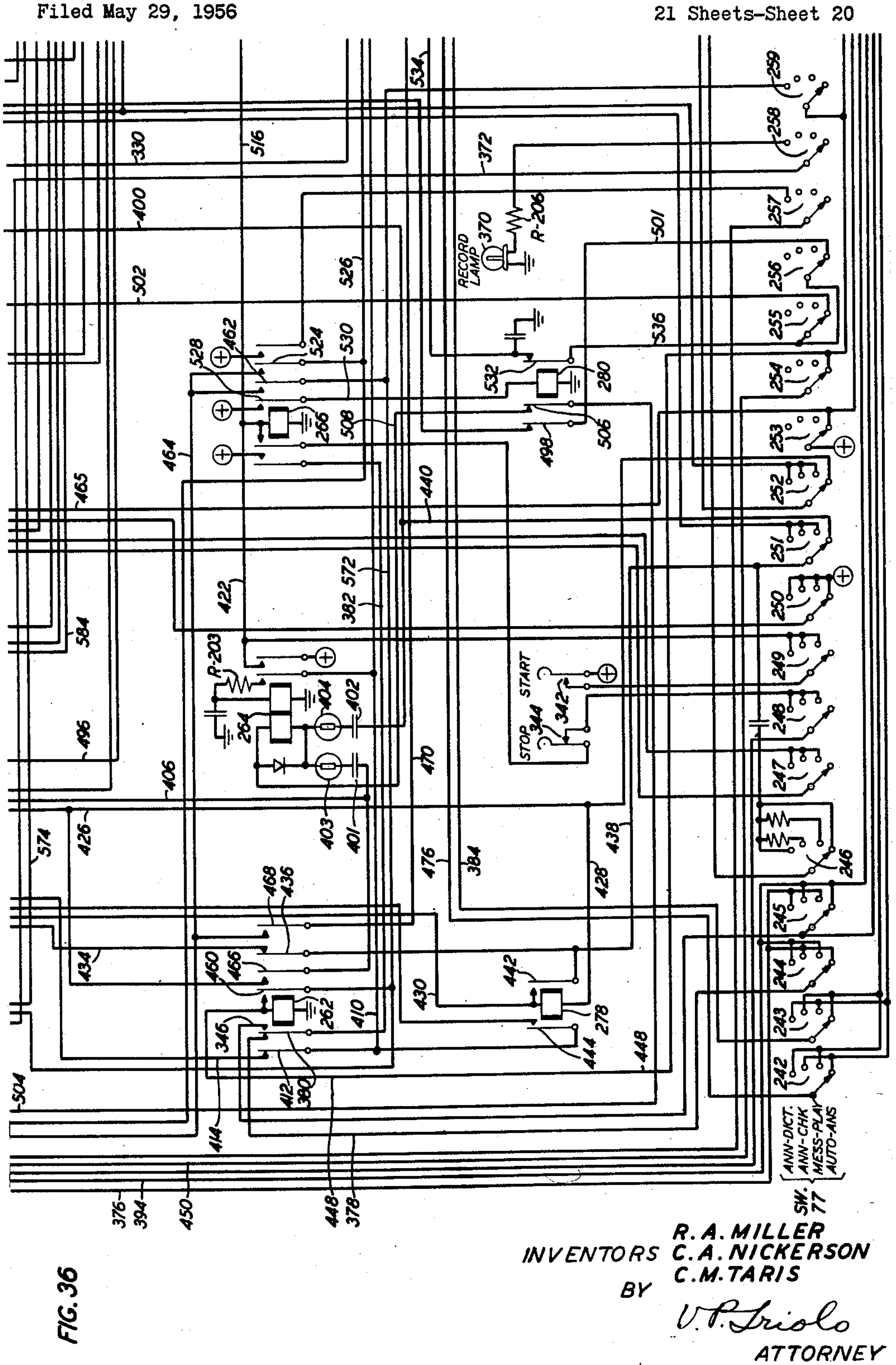
Figure 37:
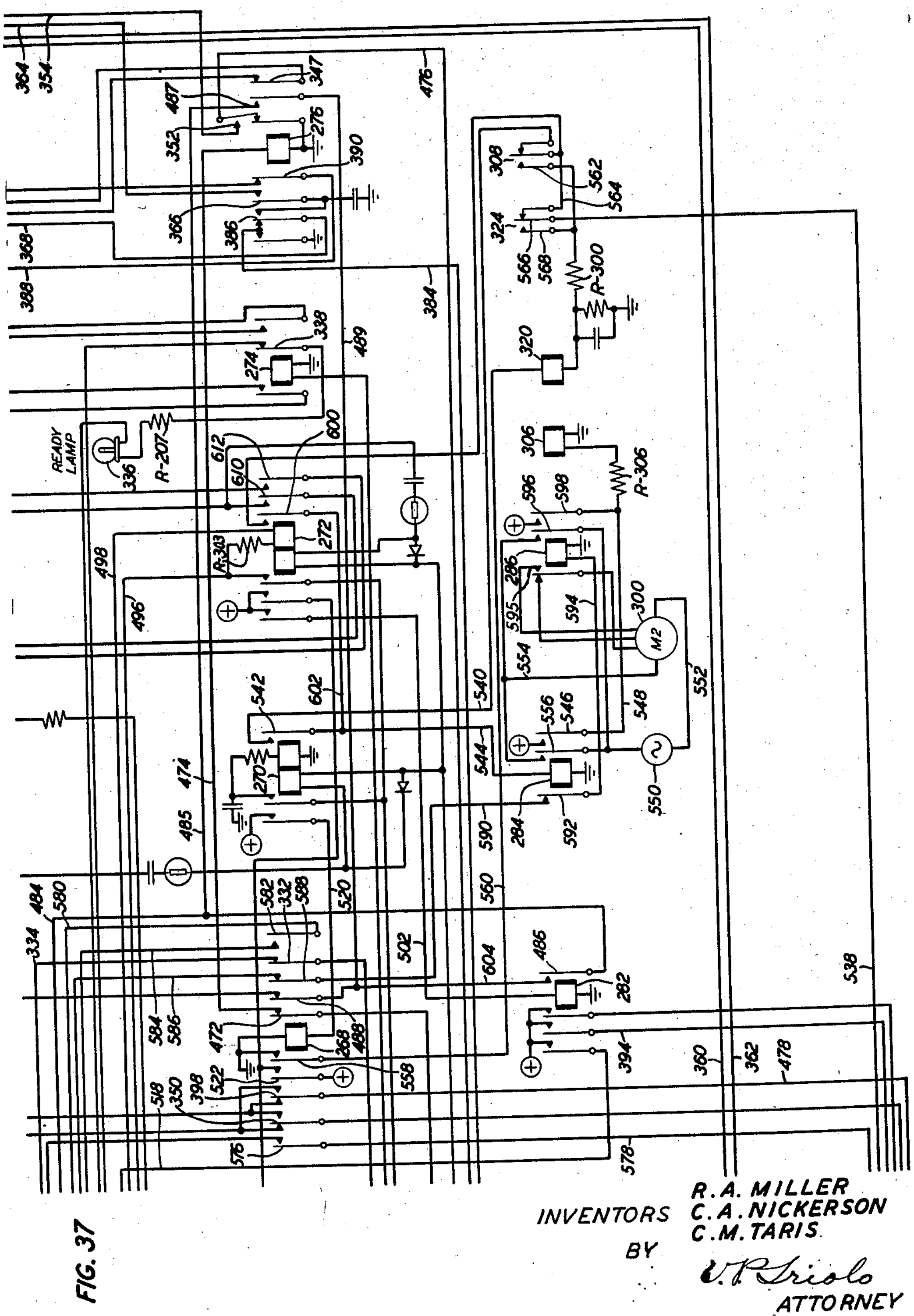

Fig. 32 is a view in front elevation showing the relative positions of the incoming message transducer carriage, the playback index carriage and the last message indicating carriage just before the end of the playback cycle and completion of the playback of the last recorded message; and Figs. 33, 34, 35 and 36, when assembled as indicated in Fig. 37, constitute a diagrammatic disclosure of the electrical and mechanical controls for the present invention.

Figure 1:
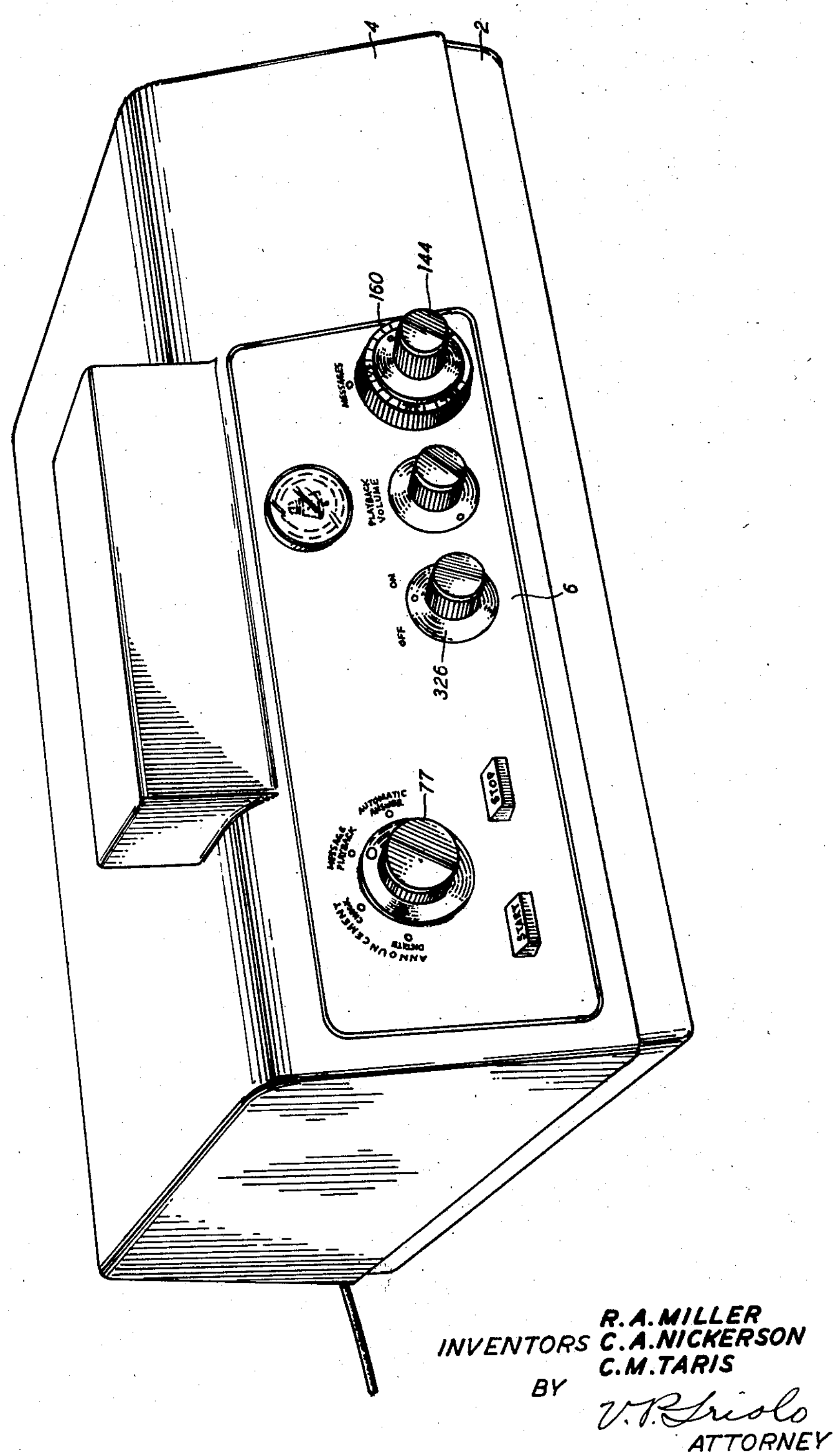
Fig. 1 is a view in perspective of an embodiment of the present invention, the components of which are disposed in a cabinet comprising a base member and a cover.
Figure 2:
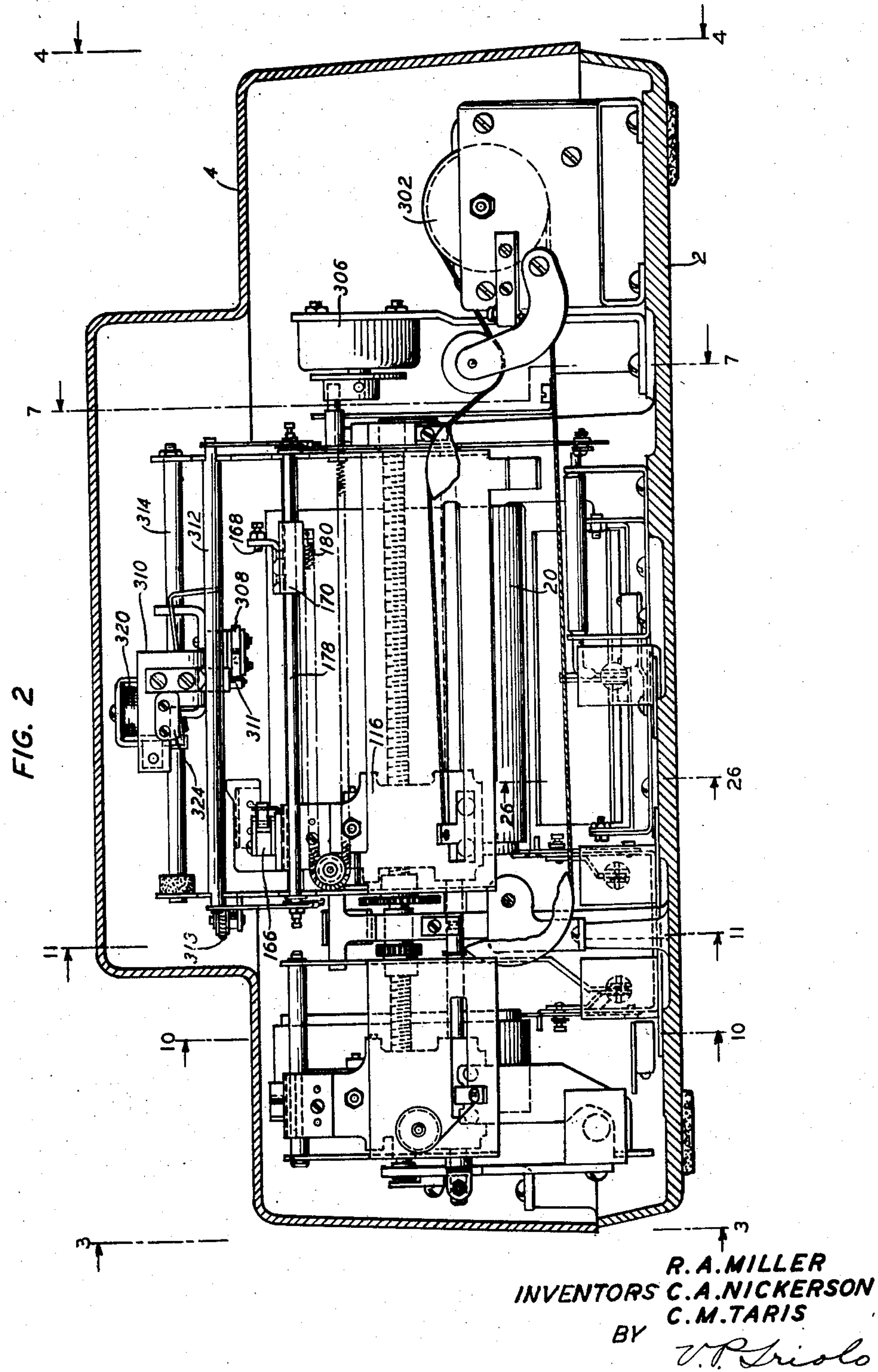
Fig. 2 is a view in front elevation of the embodiment shown in Fig. 1 with the cover removed.

As shown in Fig. 1, the entire mechanism of the present invention is enclosed in a metal cabinet comprising a base 2 and a cover 4. The subscriber-operated controls are all mounted on the front panel 6 which is part of the base assembly.

Figure 5:
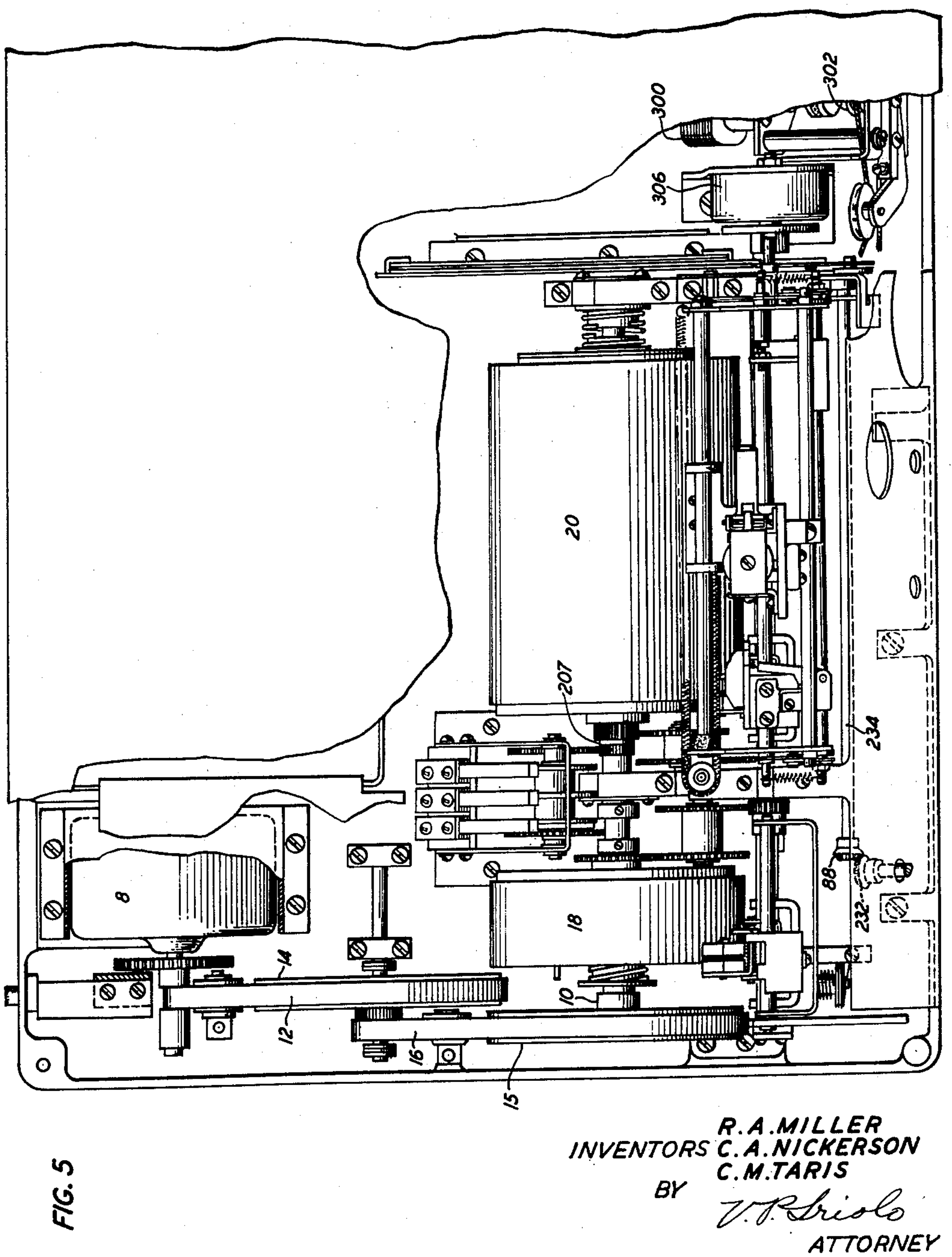
Fig. 5 is a plan view of the embodiment shown in Fig. 1 with the cover broken away.

Mounted on the base 2 (Fig. 5) are the drive motor 8 and conventional bearing supports for the drive shaft 10. Belt 12 is disposed to transmit motion from motor 8 to flywheel 14, and belt 16 is disposed to transmit motion from flywheel 14 to shaft 10. This arrangement constitutes a damped compliant system which minimizes any flutter in answering message drum 18 and incoming message drum 20 which are supported by shaft 10. The two drums are assembled on shaft 10 on bearings contained in the drum and each drum is driven from the shaft by means of a constant torque clutch (see Fig. 22), the collar 22 of which is fixedly attached to shaft 10 and slidably attached to plate 24 by means of pin 26. Plate 24 comprises a compliant member 28 which is maintained in constant frictional engagement with the drum by the spring member 30 disposed under compression between collar 22 and plate 24.

The smaller drum 18 is used for recording and reproducing the "announcement" or outgoing message. As it rotates, the drum drives gear 32 (see Fig. 8) which in turn drives the lead screw 34. As it rotates, the lead screw moves the transducer 36 across the width of the magnetizable band 38. Transducer 36 is mounted on arm 40 which is pivotally attached to bail 42. It is held in contact with the surface of band 38 during the recording and reproducing operations by spiral spring member 44. The free motion of arm 40, which permits transducer 36 to ride continuously on the surface of band 38 despite any imperfections or eccentricities in the band, is controlled by spring 44 and stops 46 and 48.

Figures 8, 22:
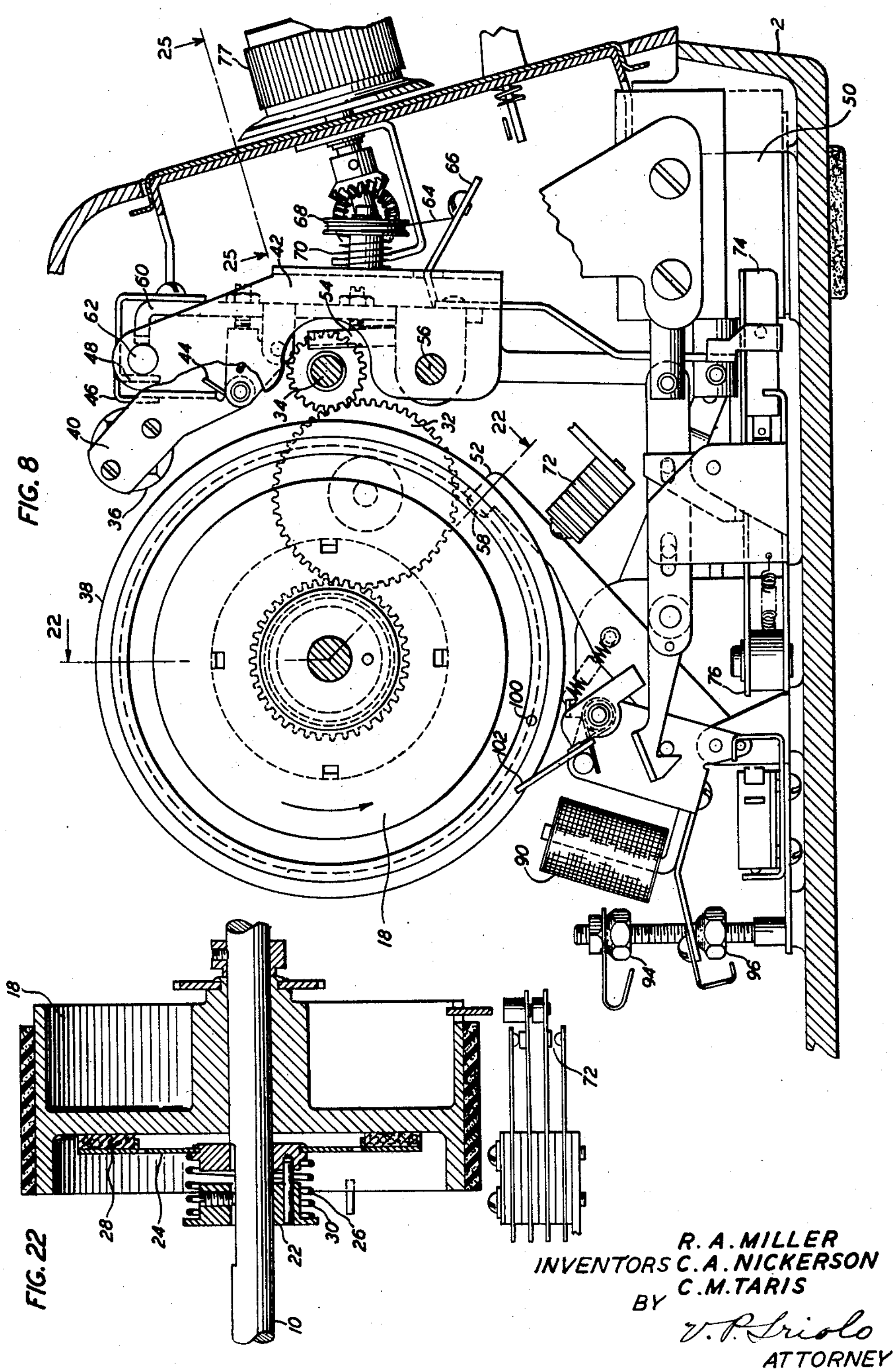
Fig. 8 is a view similar to that shown in Fig. 3 with the components disclosed in greater detail and with the driving elements removed.
Fig. 22 is a sectional view taken on the line 22—22 of Fig. 8 showing the clutch mechanism for the answering message drum.
Figure 10:
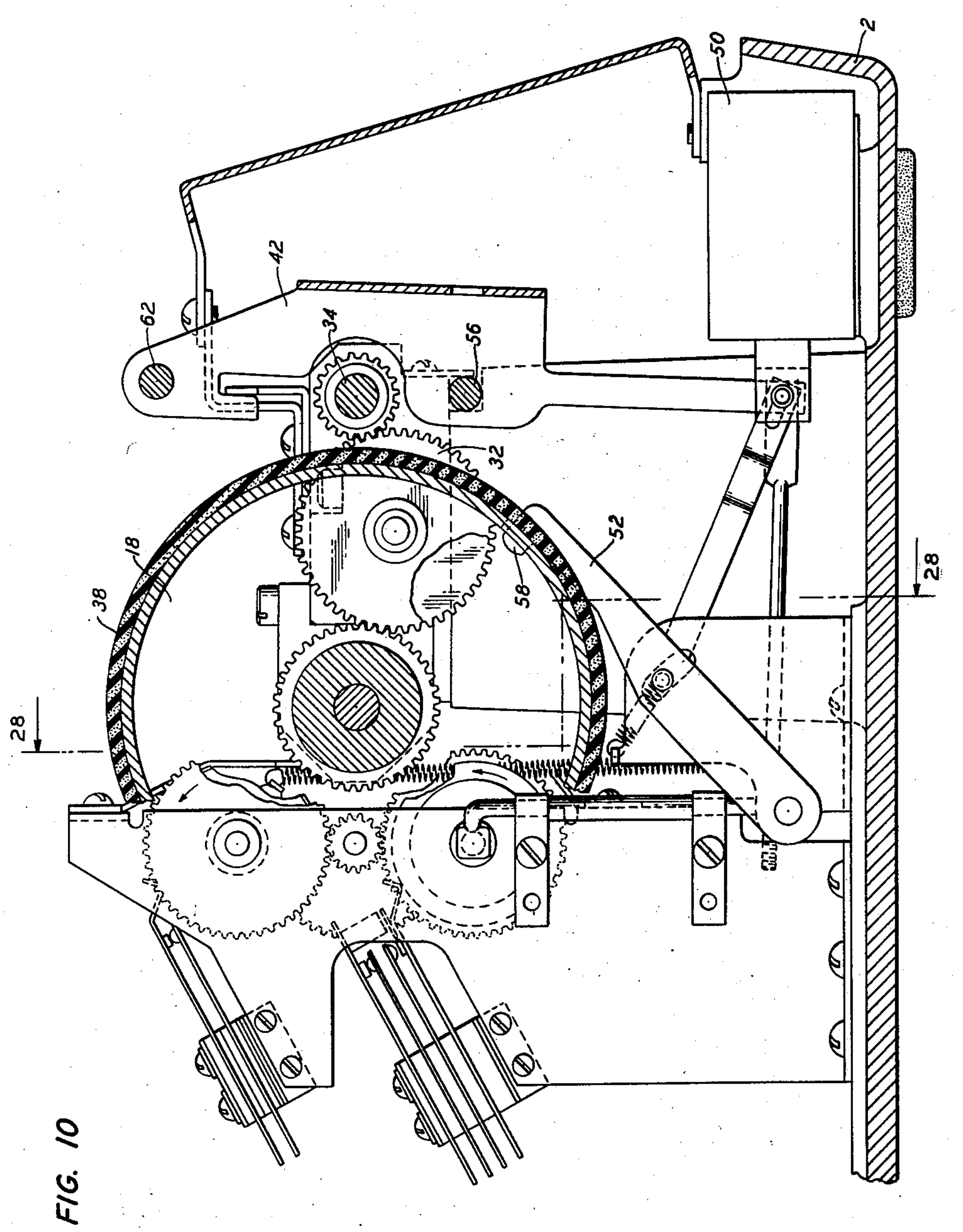
Fig. 10 is a sectional view taken on the line 10—10 of Fig. 2.

When the solenoid 50 is not energized, the pawl 52 stops rotation of the drum 18, the half-nut 54 is disengaged from the lead screw 34 and the transducer 36 is removed from contact with the magnetizable band, as shown in Figs. 8 and 10. When the solenoid 50 is energized, the bail 42 is rotated on the guide bar 56 as a pivot and the pawl 52 is disengaged from the slot 58 in drum 18, allowing the drum to rotate, the half-nut 54 is engaged with the lead screw 34 and the transducer 36 is allowed to come in contact with the band 38.

The transducer carriage 60 is supported by and slides along the bars 56 and 62 which are mounted within the bail 42. The half-nut 54 is a component of the transducer carriage. As the transducer carriage 60 moves from its zero position (from left to right) a cord 64 attached to an arm 66 of the carriage rotates a pulley 68 which winds up a spiral spring 70. When the half-nut is disengaged from the lead screw, this spring pulls the carriage back to its zero position. By causing the drum to stop always in the same position, the transducer always retraces the same track on the magnetizable band. The drum 18 is stopped in a given "index" position by providing a single slot 58 into which the stopping pawl 52 can rest. A switch 72 (Fig. 22) held closed until the pawl is seated completes a circuit to keep the driving motor running until the drum stops in the required position.

Figure 20:
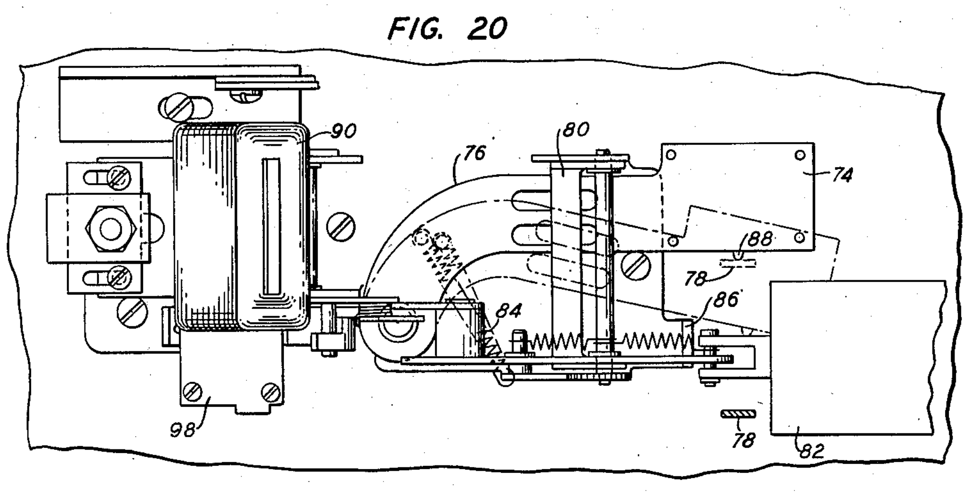
Fig. 20 is a plan view of the erase coil shown in Fig. 19.

In the embodiment of the invention shown in the drawings, provision is made for recording and reproducing outgoing messages of any length from 12 to 30 seconds with a minimum of "dead" time between the end of this message and the beginning of the recording of any incoming message. This is accomplished by means of an adjustable limit switch 74 which is automatically positioned at the end of the travel of the carriage 60. A pivoted arm 76 (Fig 20) carries switch 74 which is operated by an arm 78 which moves with the carriage 60. A friction pad 80 is arranged so that it normally presses against the arm 76 carrying the switch, holding the switch in a fixed position. When the machine is running with the function switch knob 77 in the "announcement-dictate" position, the solenoid 82 releases the friction pad 80 and allows the switch arm 76 to take up a new position. Since the spring 84 pulls the switch arm 76 toward the zero position, the first effect when the friction pad is released is for the switch arm to return to a stop 86 near the zero position. It does not go back to zero because there is provided a minimum outgoing message time of 10 to 15 seconds. When the outgoing message time is greater than the specified minimum time, and the carriage reaches this position, the carriage arm 78 pushes against the switch operated pin 88, moving the switch and arm but not operating the switch. When the subscriber has finished dictating his outgoing message and presses the "stop" key, the solenoid 82 is released, allowing the friction pad to be pressed against the switch arm. This holds the arm and switch in this position for all subsequent operations until a new outgoing message is recorded. Consequently, when the outgoing message is reproduced, the carriage progresses to the end of the message, then the carriage arm 78 operates switch 74 releasing the solenoid 82, and causing the carriage to return to zero. Operation of switch 74 also starts the incoming message drum and operates relays which make the necessary changes in connections for recording incoming messages.

Figure 19:
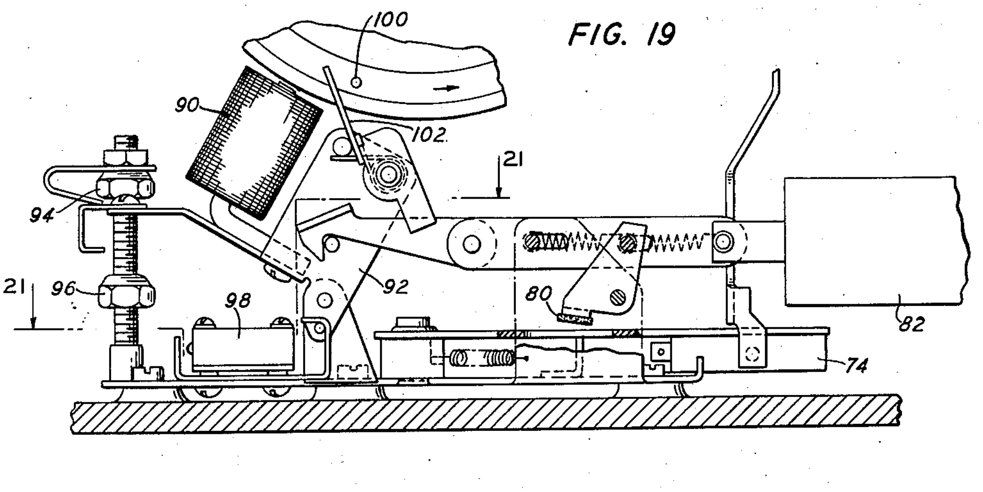
Fig. 19 is a detail view in the operated position of the answering message drum erase coil mechanism shown in Fig. 8.
Figure 21:
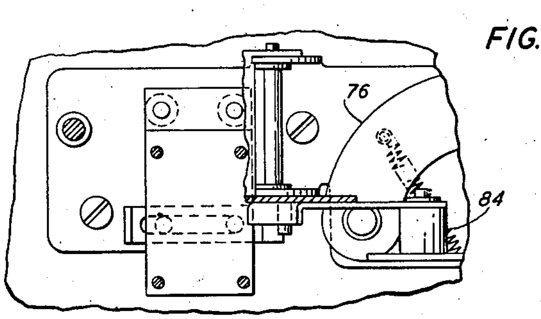
Fig. 21 is a sectional view taken on the line 21—21 of Fig. 19.
Figure 30:
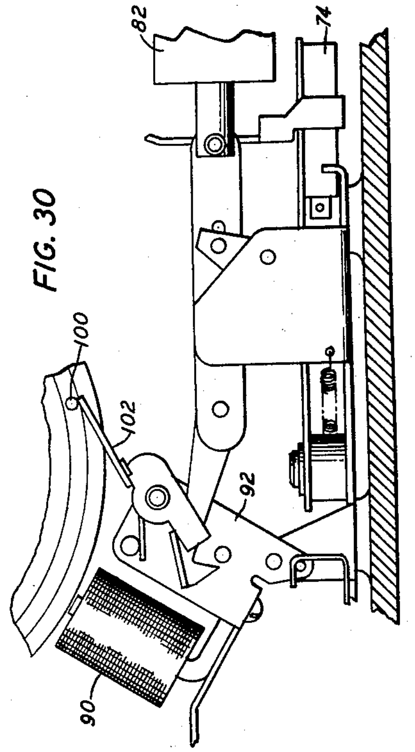
Fig. 30 is a view similar to the view in Fig. 19 with the latch mechanism operated by the pin on the answering message drum after the erase cycle has been completed.

Before a new outgoing message is recorded, the previous one must be erased. This is accomplished by means of an iron core coil 90 which is energized by 60-cycle current and held near the drum 18 for one revolution. The core has a face approximately the length of the record area on the drum so that the entire helical track is erased in one revolution of the drum. The erase coil (Fig. 19) is mounted on a pivoted arm 92 and the stops 94 and 96 are so arranged that the core comes within 0.020 inch of the magnetizable band 38 when erasing but is about 0.4 inch from the band when not in use. This latter distance is to prevent remanent noise magnetization of the band when the erasing current is turned off by switch 98 which is operated just before the coil reaches its rest position. The erase coil is moved to its operating position by the same solenoid 82, which releases the arm 76 holding the adjustable limit switch 74. However, since switch 74 must be released during the entire time of recording the outgoing message, but the erase coil is to be operated for only one revolution, the latter is mechanically released by the pin 100 on drum 18. This pin, after one revolution, engages the latch 102 (Figs. 19 and 30) which releases the erase coil 90 while solenoid 82 remains energized. Pin 100 is located so that it does not engage the release latch 102 after the first revolution. The latch 102 assumes its original position, under the pressure of a spiral spring, after it is released by the pin 100.

Figure 6:
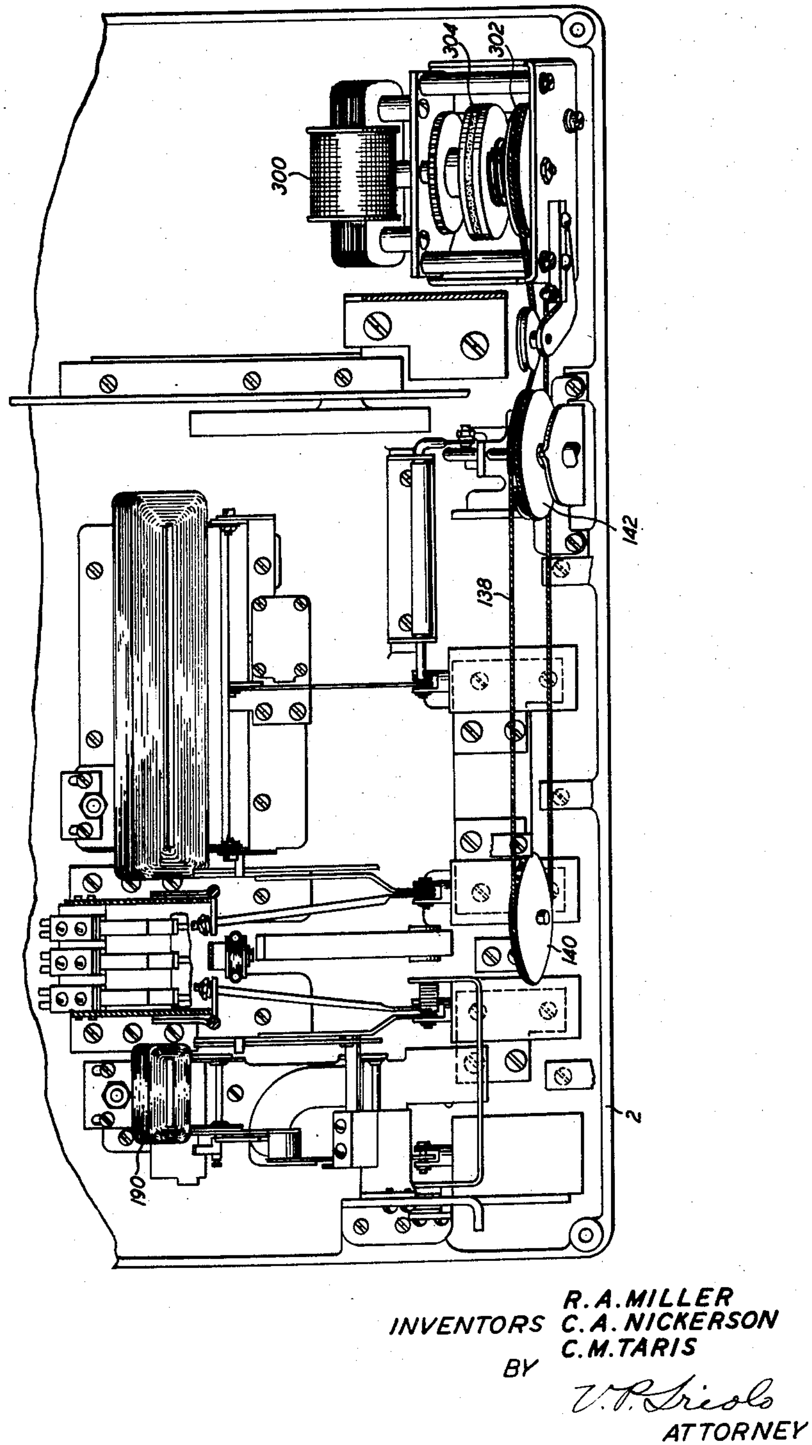
Fig. 6 is a plan view of the embodiment shown in Fig. 1 with the cover, answering drum, message-receiving drum and transducer carriages removed.
Figure 9:
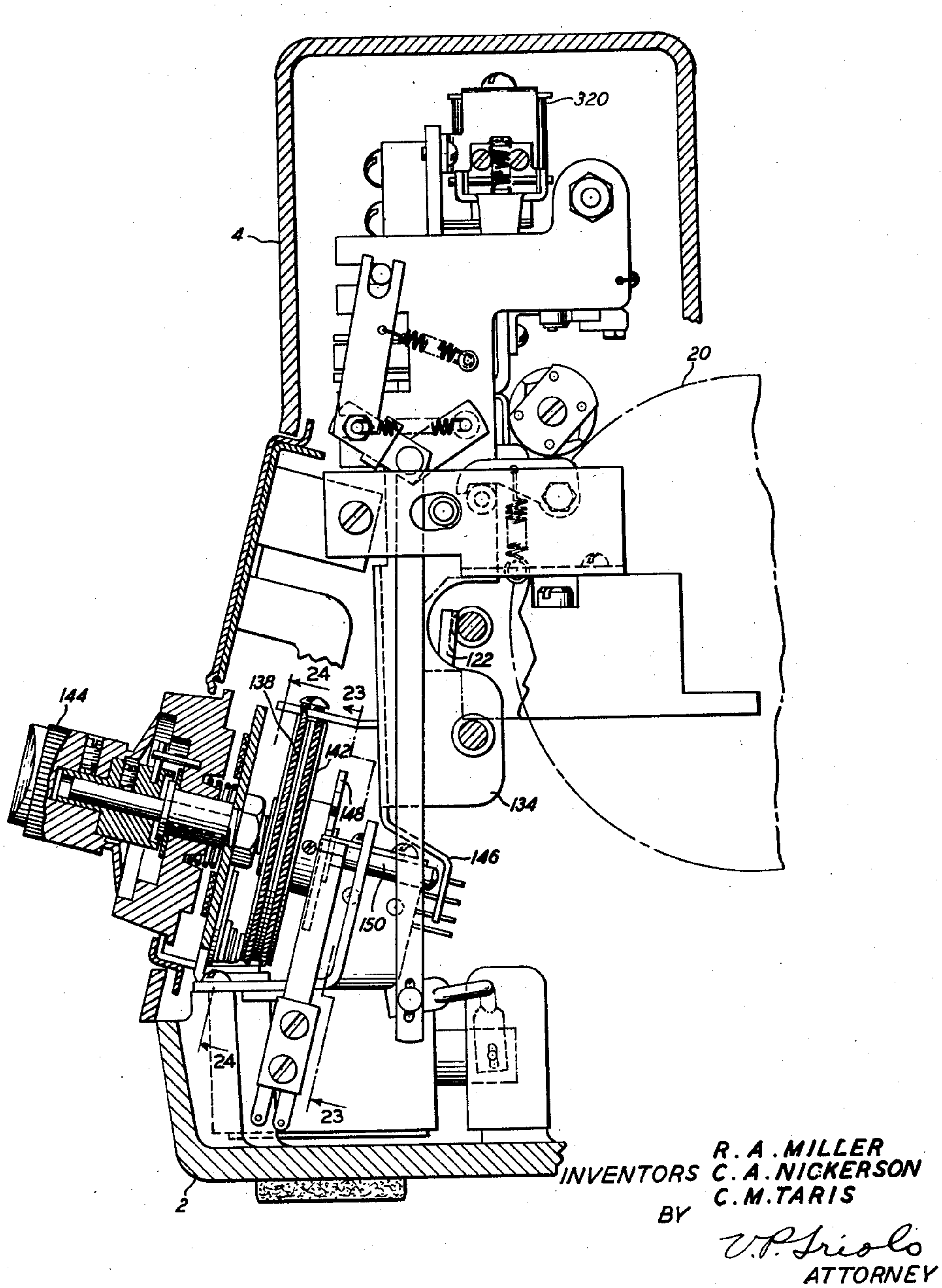
Fig. 9 is a view similar to that shown in Fig. 7 with the components disclosed in greater detail.
Figure 11:
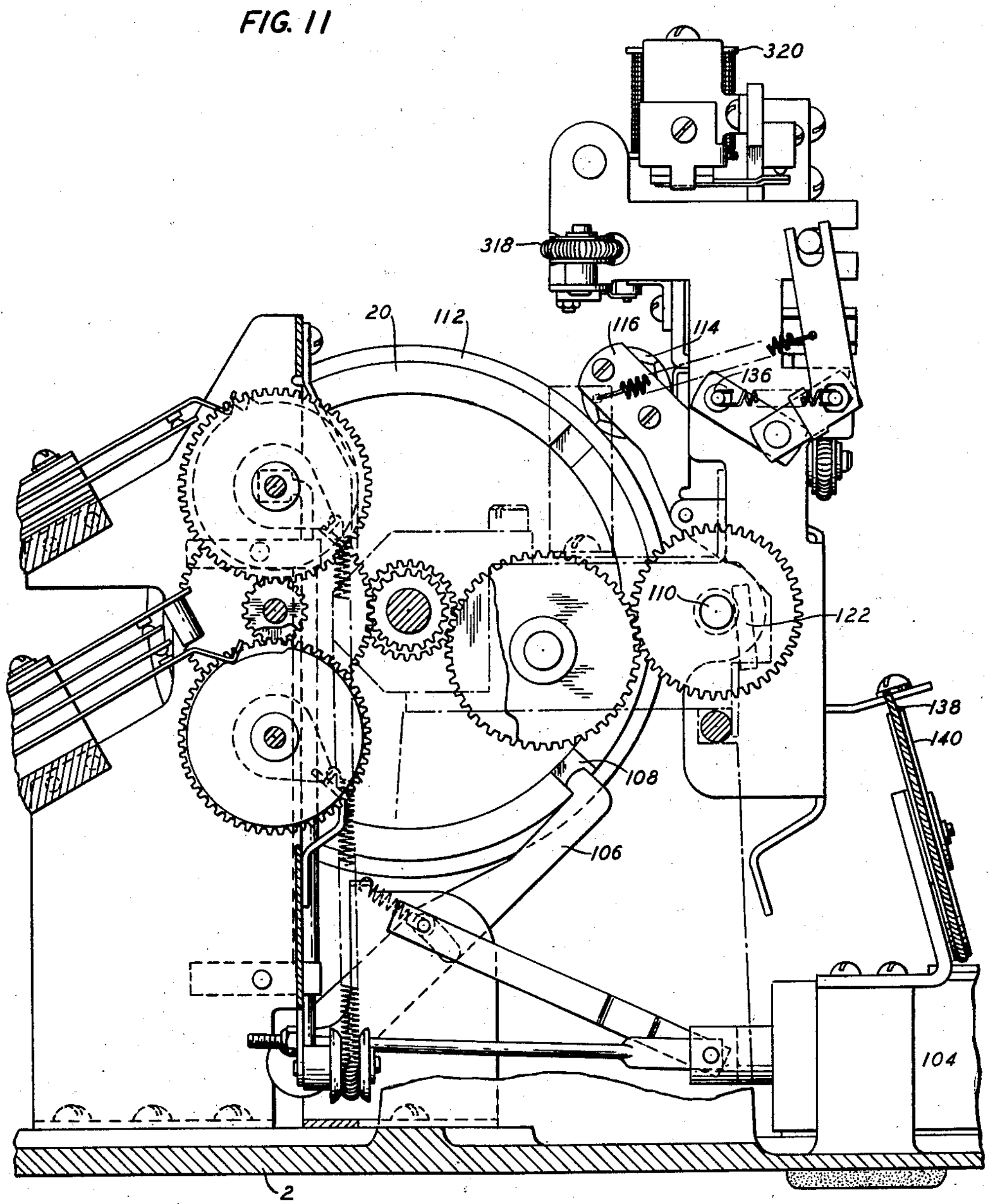
Fig. 11 is a sectional view taken on the line 11—11 of Fig. 2.
Figure 14:
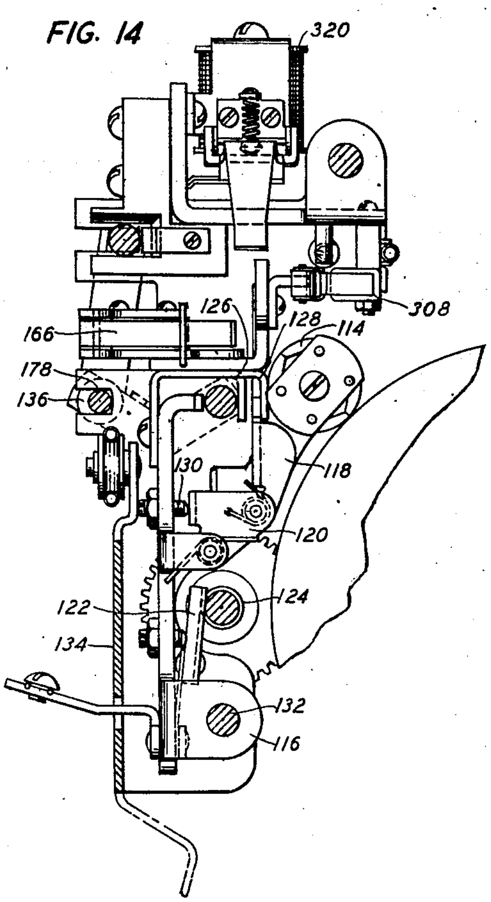
Fig. 14 is a sectional view taken on the line 14—14 of Fig. 12.
Figure 15:
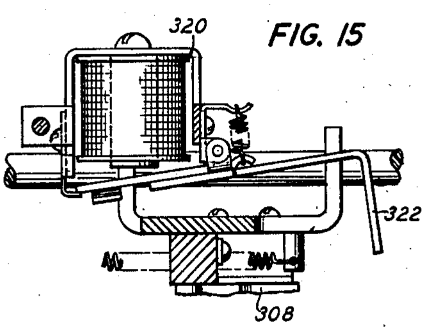
Fig. 15 is a view in front elevation of the playback index carriage.
Figure 16:
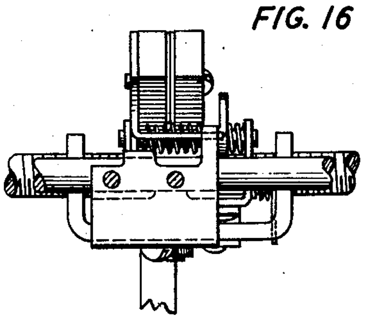
Fig. 16 is a sectional view taken on the line 16—16 of Fig. 12.
Figure 23:
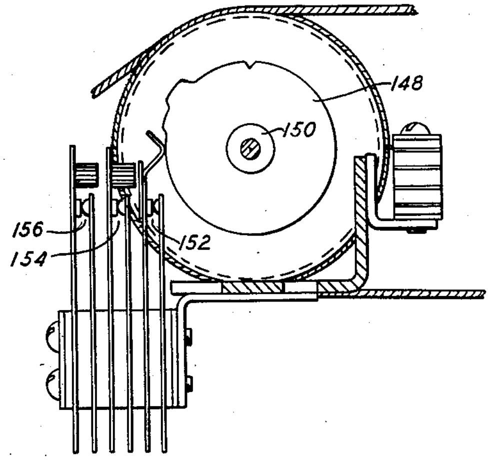
Fig. 23 is a sectional view taken on the line 23—23 of Fig. 9.
Figure 24:
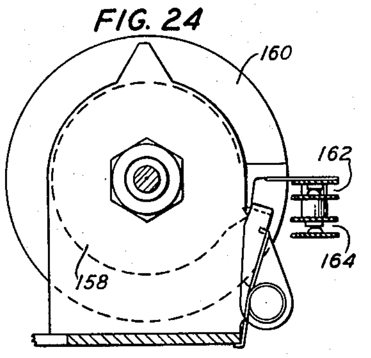
Fig. 24 is a sectional view taken on the line 24—24 of Fig. 9.

The larger drum 20, on which incoming messages are recorded, is driven by a continuously rotating clutch similar to that used on the "talk-out" drum 18 but located at the opposite end, away from the drive pulley 15. Rotation of drum 20 is controlled by the solenoid 104 and pawl 106 (Fig. 11). There are four slots 108 in drum 20 in which the pawl can engage to stop the drum. The four-slot arrangement is satisfactory since it is not necessary to stop drum 20 in the same position each time. As drum 20 rotates, it turns the associated lead screw 110 through a gear reduction which provides a track spacing of 0.025 inch, center to center on the magnetizable band 112. The maximum time available for individual "talk-in" messages is 30 seconds and a total of 10 minutes of recording space is available for recording these messages on drum 20. The transducer 114 (Fig. 14) is mounted on carriage 116 by means of the spring tensioned pivoted arm 118 and the spring tensioned pivoted bracket 120, with the half-nut 122 adapted to engage the lead screw 124. The pivotal motion of the arm 118 is limited by the stops 126 and 128. The screw 130 is employed to adjust the position of bracket 120 which in turn adjusts the position of arm 118 to provide the required tangency relationship between the transducer and the magnetizable band. The carriage 116 is supported by, and slides along, the guide bar 132 on which the bail 134 pivots. When the talk-in unit is in condition to receive messages, the half-nut 122 is held in engagement with the lead screw 124. The stop 126 is also employed to support and guide the carriage 116 along the slide bar 136. Carriage 116 is connected by means of the flexible cable 138 and pulleys 140 and 142 (Figs. 6 and 11) to the message scanning knob 144 (Fig. 9) which appears on the front panel. Knob 144 rotates as carriage 116 is moved by lead screw 124 and shows the position of transducer 114 in relationship to a zero-message position mark on front panel 6. When playing back messages at the station in which the equipment is located, this knob is used for manually moving transducer 114 to any desired part of drum 20 to pick out any message or to repeat a message. Before this can be done, it is necessary to disengage the half-nut 122 from lead screw 124, which is done by pushing in on the scanning knob 144. This engages the arm 146 on the bail 134 on which carriage 116 is mounted, moving it enough to release the half-nut 122. This motion, however, is not enough to affect the cable 138 running on the pulleys 140 and 142. A cam 148 is mounted on the scanning knob shaft 150 to operate switches 152, 154 and 156 (Fig. 23). The functions of these switches, which are operated in sequence, will be described hereinafter. Another cam 158 on the same shaft (Fig. 24) but part of the indicator dial 160 operates switch 162 which controls mechanism for erasing incoming messages.

Figure 12:
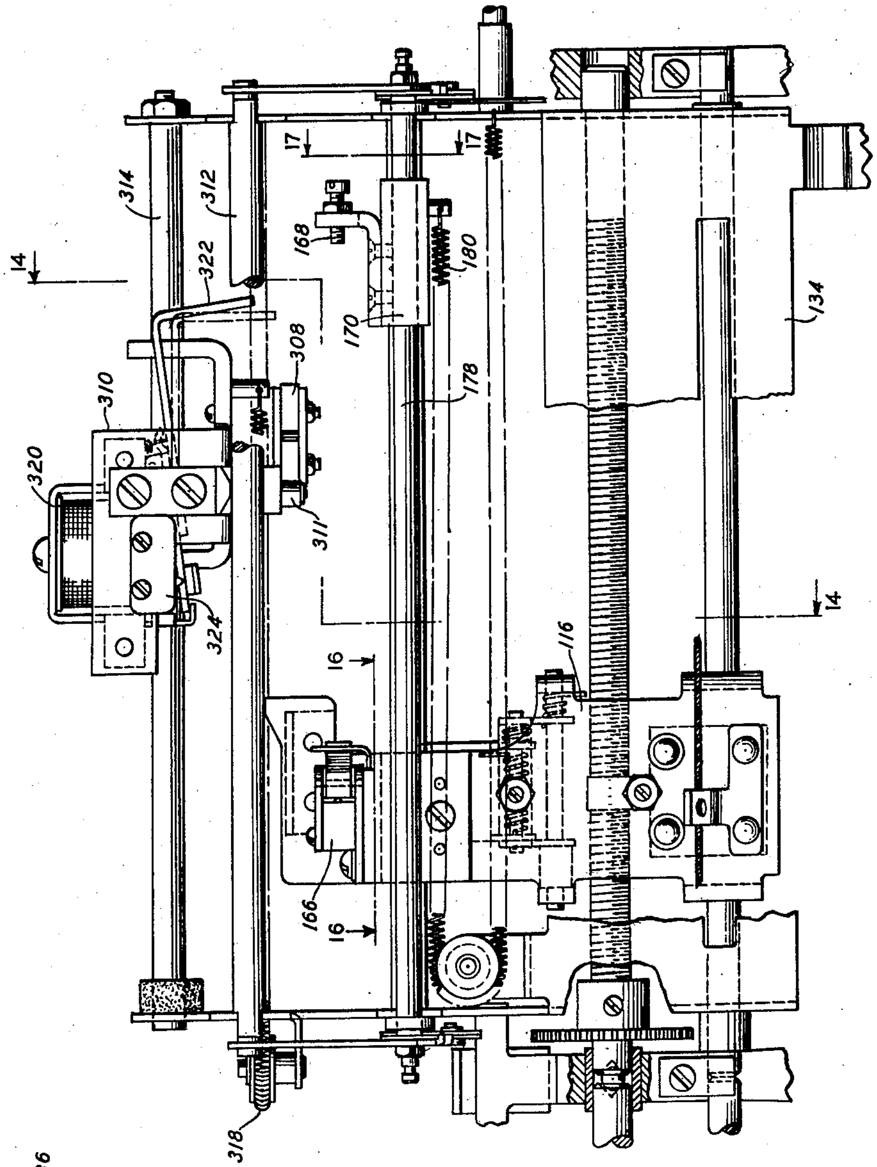
Fig. 12 is a detail view of the incoming message transducer carriage, playback index carriage and pilot or last message indexing carriage shown in Fig. 2. (In order to define their structure more clearly, these carriages are shown in relative positions which they are not likely to assume during the operation of the machine)
Figure 17:
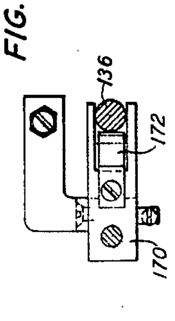
Fig. 17 is a sectional view taken on the line 17—17 of Fig. 12.

The talk-in unit is also equipped with a switch 166 (Figs. 12 and 13) which prevents recording over a portion of the drum already used. This switch is attached to the transducer carriage 116 and is actuated by the adjustable member 168 attached to "pilot" carriage 170. Carriage 170 has a locking spring 172 normally pressed against the slide bar 136 on the bail 134 with sufficient friction to hold it in position but not enough to prevent the transducer carriage 116 from pushing it ahead during the recording of messages. When the machine is set for answering an incoming call with the talk-in transducer 114 at the beginning of the transducer carriage travel, the carriage 170 is released by means of the solenoid 174, which also controls the operation of the talk-in erase coil as will be explained hereinafter, before the first message is recorded. The release of carriage 170 is accomplished when the solenoid 174 (Fig. 26) actuates the arm 176 which in turn moves the slide bar 178 away from slide bar 136. When released, carriage 170 is pulled to the zero position by means of the coil spring 180. Switch 166 remains closed during the recording of incoming messages but is opened when transducer carriage 116 is moved for scanning messages during playback.

The indicator dial 160 is provided to show the maximum extent of recording on the talk-in drum 20. This is useful in case a relatively small proportion of the drum is used and the subscriber wishes to set the machine for recording additional messages without erasing those already recorded, although he may have played back one or more of the messages on the drum. The dial 160 is mounted between the front panel 6 and the message scanning knob 144 and is rotated by knob 144 during recording. However, it remains in position when the scanning knob 144 is turned for playing back messages and must be manually returned to zero before incoming messages can be erased at the station. This indicator dial 160 is not moved by the mechanisms involved in remote erasure, as described hereinafter. Therefore, when the subscriber returns to the station after a remote erasure, he will have to turn the dial to the left until a definite stop is reached. The dial will then indicate the extent to which incoming messages have been recorded on the drum since the remote erasure.

Figure 26:
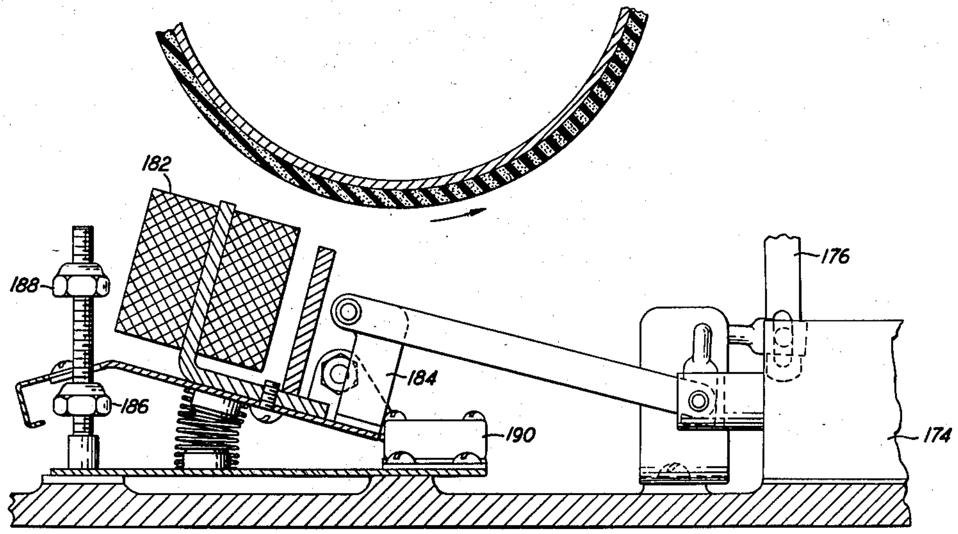
Fig. 26 is a sectional view taken on the line 26—26 of Fig. 2 showing the incoming message drum erase coil mechanism in the non-operated position.
Figure 27:
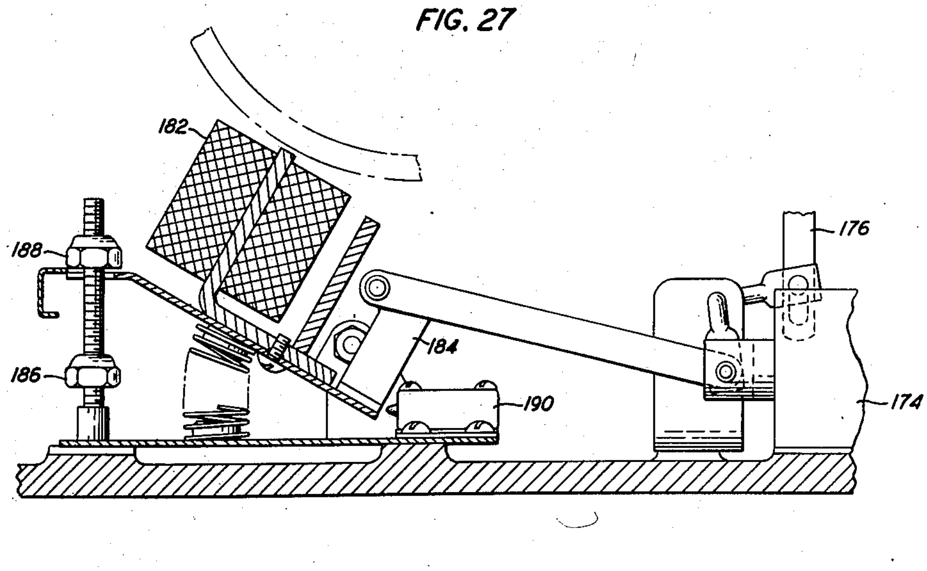
Fig. 27 is a sectional view showing the incoming message drum erase coil mechanism in the operated position.
Figure 29:
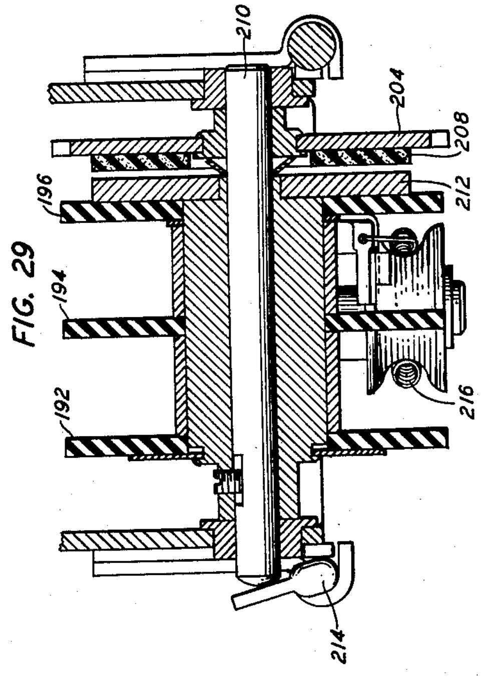
Fig. 29 is a sectional view taken on the line 29—29 of Fig. 28.

Erasing of the incoming messages is accomplished by means of 60-cycle current in a manner similar to that used for the talk-out drum 18. The core of erase coil 182 (Figs. 26 and 27) is approximately the length of the record area, is mounted on the pivoted arm 184 and is permitted to move between the stops 186 and 188. It is actuated by the solenoid 174, as will be explained hereinafter. The 60-cycle current is turned on and off by the switch 190 which is actuated by the pivoted arm 184 (Figs. 26 and 27). Arm 184 operates switch 190 to turn off the erase current just before coil 182 reaches its rest position. Since the talk-in message drum 20 is not always stopped at the same angular position, it is not feasible to have the erase cycle timed directly by the drum. The timing is done as described hereinafter by cam 192 through the second winding of relay 272 and switch 162. Solenoid 174 is energized through the operation of relay 282 for 3½ seconds or slightly more than one revolution of the talk-in drum 20.

Figure 28:
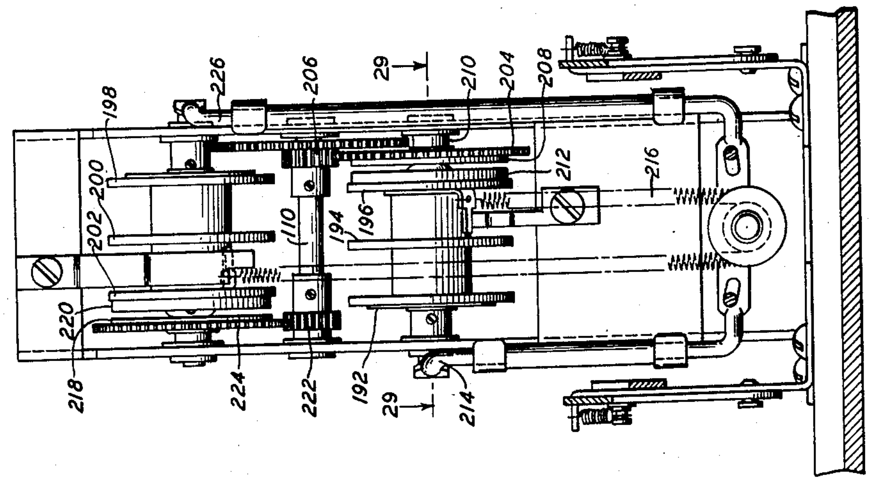
Fig. 28 is a sectional view taken on the line 28—28 of Fig. 10 showing the timing cams and the wind-up return spring therefor.

Various timing functions are performed by the cams 192, 194 and 196 which are driven when talk-out drum 18 rotates, and cams 198, 200 and 202 which are driven when talk-in drum 20 rotates (Fig. 28). Gear 204 which is driven continuously by gear 206 which in turn is driven by gear 207 on the main drive shaft 10 provides continuous drive to the clutch 208 mounted on gear 204 and the cam shaft 210. Clutch 208 which connects the cams 192, 194 and 196 to the driving gears 204 and 206 on engaging clutch plate 212 is actuated by the lever 214 operated by solenoid 50, which also releases the stop pawl 52 on the talk-out drum 18. Consequently, these cams start to rotate as soon as drum 18 starts to rotate. As the cams rotate, they operate their respective contact springs and also wind up the return spring 216. At the end of the talk-out message, solenoid 50 is released, releasing clutch 208 and allowing cams 192, 194 and 196 to be returned to their initial inoperative positions by the spring 216. The other end of spring 216 is attached to cams 198, 200 and 202 and thus serves to return either set of cams to their initial position. Similarly, cams 198, 200 and 202 are driven through clutch 218, clutch plate 220 and gears 222 and 224 by lever 226 operated by solenoid 104 at the same time solenoid 104 operates the talk-in drum release pawl 106.

Figure 7:
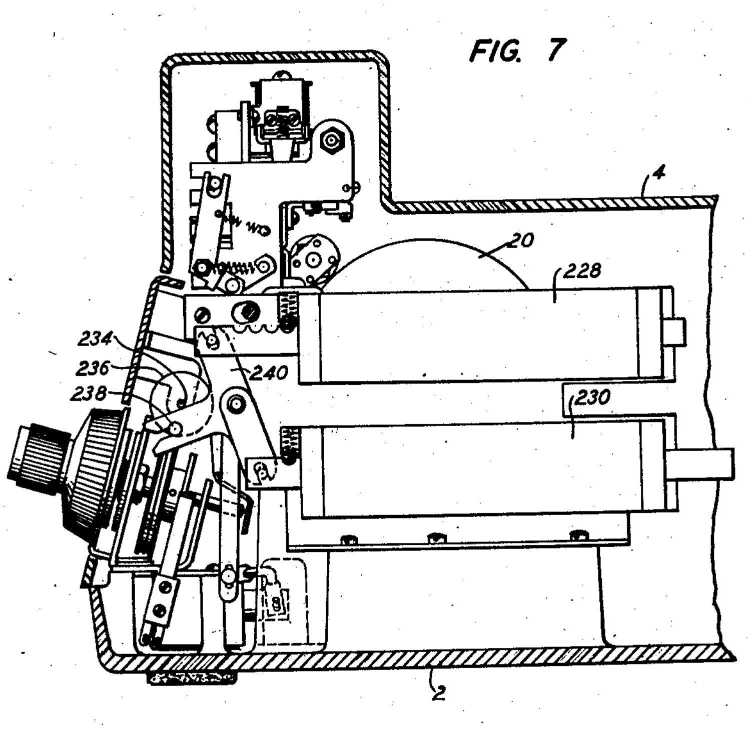
Fig. 7 is another partial view in side elevation of the embodiment shown in Fig. 1.
Figure 4:
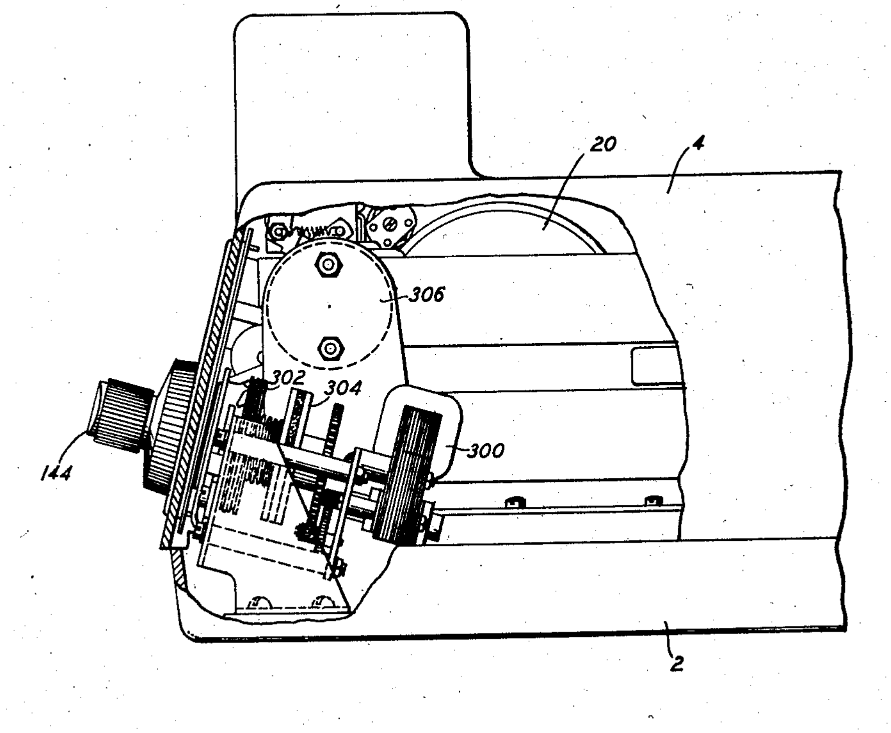
Fig. 4 is a view in side elevation taken on the line 4—4 of Fig. 2.
Figure 25:
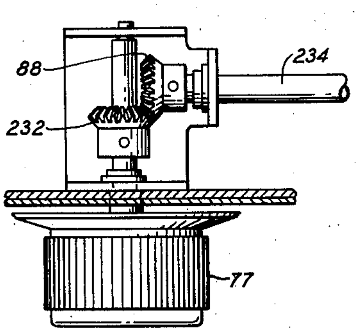
Fig. 25 is a sectional view of the function knob drive.
Figure 31:
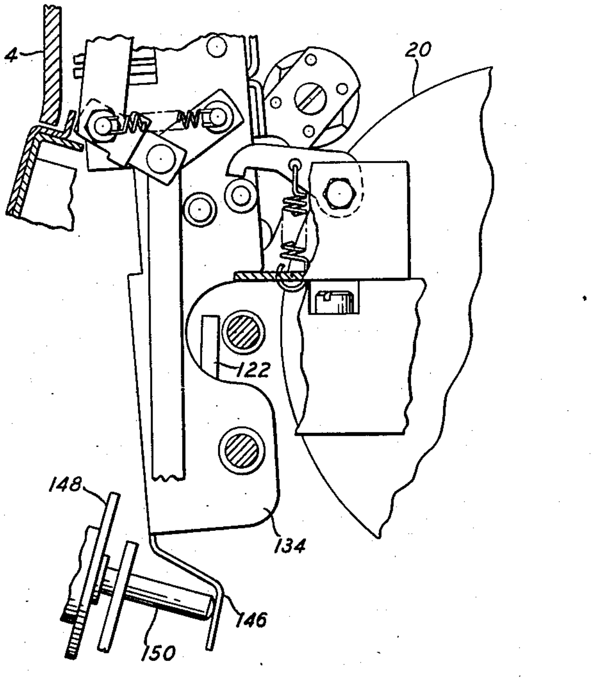
Fig. 31 is a fragmentary view showing the incoming message transducer carriage mechanism in Fig. 9 disengaged from the lead screw by the scanning knob.

In order to change from one function to another, these functions being designated on the front panel 6 as announcement-dictate, announcement-check, message playback and automatic answer, it is necessary to effect a number of changes in connections. These are accomplished by the slide switches 228 and 230 (Fig. 7) manipulated by the function switch knob 77. A bevel gear 232 on the knob shaft engages a similar bevel gear 88 (Figs. 5 and 25) on a rod 234 extending to the right side of the machine behind the front panel. On rod 234 is a plate 236 carrying a pin 238 which engages in a pivoted T arm 240 in a manner to push the slider of one switch in and the other slider out. Flat bars on the slides engage spring contact clips to make or break circuits as required. These contacts make up switches 242 to 259 (Fig. 35).

Figure 34:
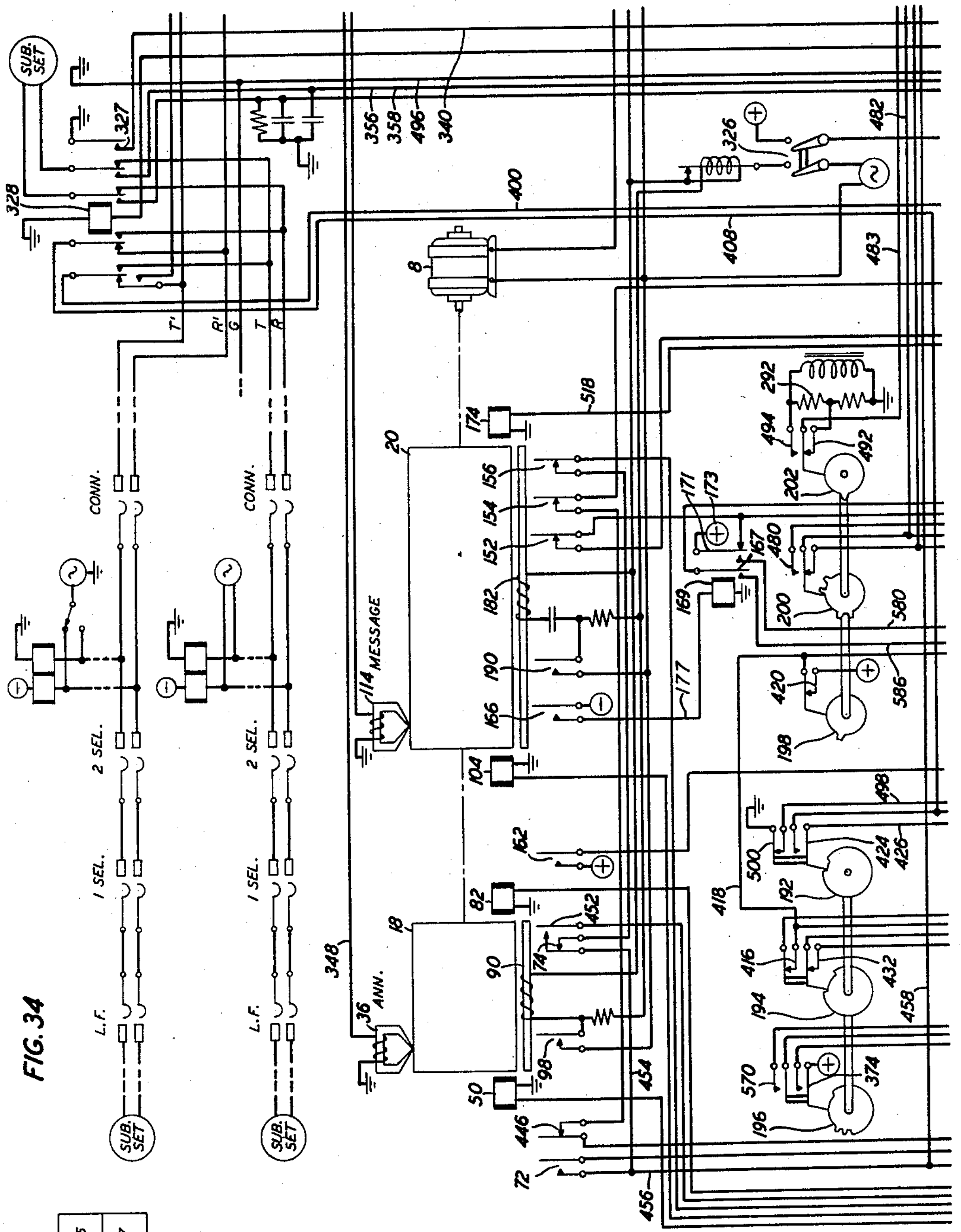

A single speech amplifier consisting of tubes V1, V2 and V3 is used for recording and reproducing both incoming and outgoing messages. Associated with the speech amplifier are the automatic volume control amplifier V4, the recording bias oscillator V5 and a "beep" tone amplifier V6 (Fig. 34). When recording, audio output from V3 is combined with the high frequency bias from V5 and connected to one of the electromagnetic transducers 36 and 114 by way of T3, relay 276 and switches 242 and 243.

Bias oscillator V5 is designed to operate at a frequency of about 14,000 cycles per second. When the speech amplifier is used for reproducing sound from either record medium 38 or 112, relay 276 is not operated and the filaments of V4 and V5 are shunted by the resistor R–117. This reduces the filament current in these tubes to about one-third of normal and eliminates high frequency bias and automatic volume control while reproducing either the talk-out or talk-in message.

Automatic volume control is used during recording of both the talk-out and talk-in messages. The automatic volume control circuit is disabled during the transmission of "beep" tones (while recording talk-in messages) by means of the cam 200 which energizes the "beep" tone amplifier V6.

Figure 3:
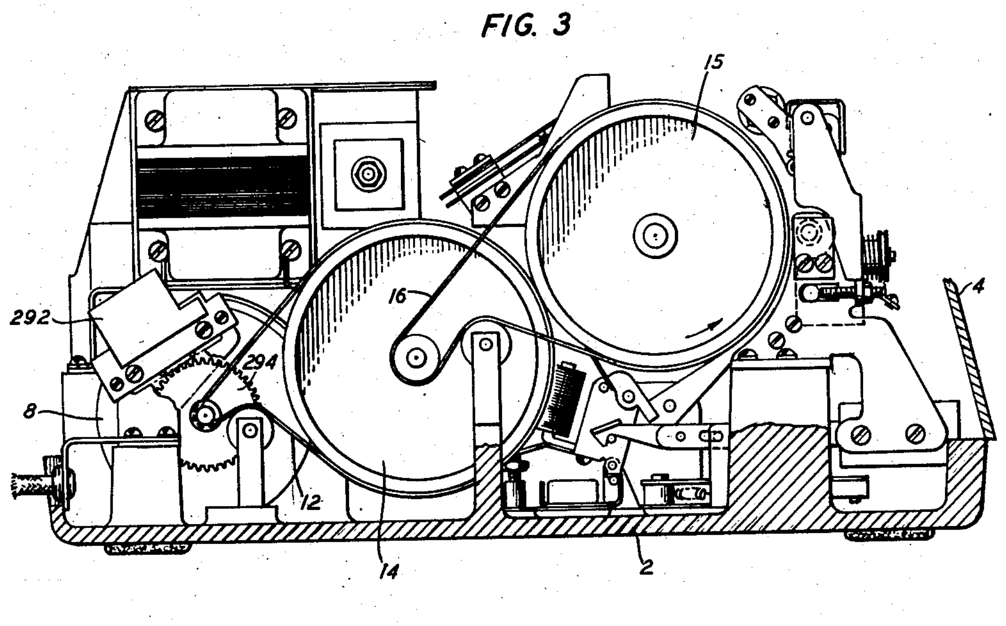
Fig. 3 is a view in side elevation taken on the line 3—3 of Fig. 2 shown partially in section, with the cover broken away.
Figure 33:
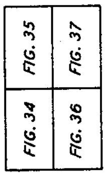

Signal or "beep" tones are obtained from the tone generator 292, the rotor 294 (Fig. 3) of which is mounted on the shaft of motor 8. The rotor 294 forms a path of variable magnetic reluctance between two pole-pieces, each surrounded by a coil of wire and connected by a permanent magnet. As the rotor turns the variation of magnetic flux induces an alternating voltage in the coil at a frequency of approximately 1400 cycles. The comparatively low level from tone generator 292 is amplified by V6 before transmission on the telephone line. Transformer T2 serves as an output transformer for V6 as well as an isolation transformer. The "beep" tone level is controlled by resistors R–204 and R–205 (Fig. 33). The level of the first three beeps (two at the beginning of the talk-in message and the first of the two final warning tones) is set by the voltage dividers R–204 and R–205 to give a level of about −10 decibels (as referred to one milliwatt) on the line. Cam 202 operates at the same time as the last lobe on cam 200 to increase the level of the last "beep" to about −5 decibels (as referred to one milliwatt). Plate current is connected to V6 through T2, closed contacts of relays 268, 276 or 282 and cam 200.

Direct current for the amplifier, relays, solenoids and lamps is obtained from rectifiers 296 and 298 connected to separate windings of the power transformer T4. Rectifier 296 supplies 48 volts for the signal lamps, solenoids and relays. This power is on continuously (when the on-off switch is on) in order that the signal lamps and relays may be immediately available for use. Current for operating relay 278, the "calling party disconnect" relay, is obtained from the central office battery. Rectifier 298 supplies 75 volts for the amplifier only when the machine is in operation (relay 274 operated).

*Control from a distant or remote station.*—As in the system disclosed in patent application Serial No. 331,157, filed January 14, 1953, and referred to hereinbefore, the embodiment of the invention shown in the drawings is designed to function with "calling party disconnect" facilities, that is, the recording device may be disabled by means responsive to a disconnect condition established by the calling party. Also, the machine shown in this embodiment is constructed so that on all calls subsequent to the first, made by the subscriber for playback to a remote station, transducer carriage 116 will return to the point of recording last heard rather than to the beginning of the first message.

To play back the incoming message record to a remote station, the manual means used for scanning the record at the station is replaced by the scan motor 300 (Figs. 2, 5, 6 and 36). The scan motor imparts motion to the incoming message transducer carriage 116 through pulley 302 over which the scanning cable 138 rides, the pulley 302 being driven by motor 300 through a friction clutch 304. Solenoid 306, which is coupled to the incoming message bail 134, serves to disengage half-nut 122 from lead screw 124 to permit movement of carriage 116 along its slide rod 132 by scan motor 300.

Figure 18:
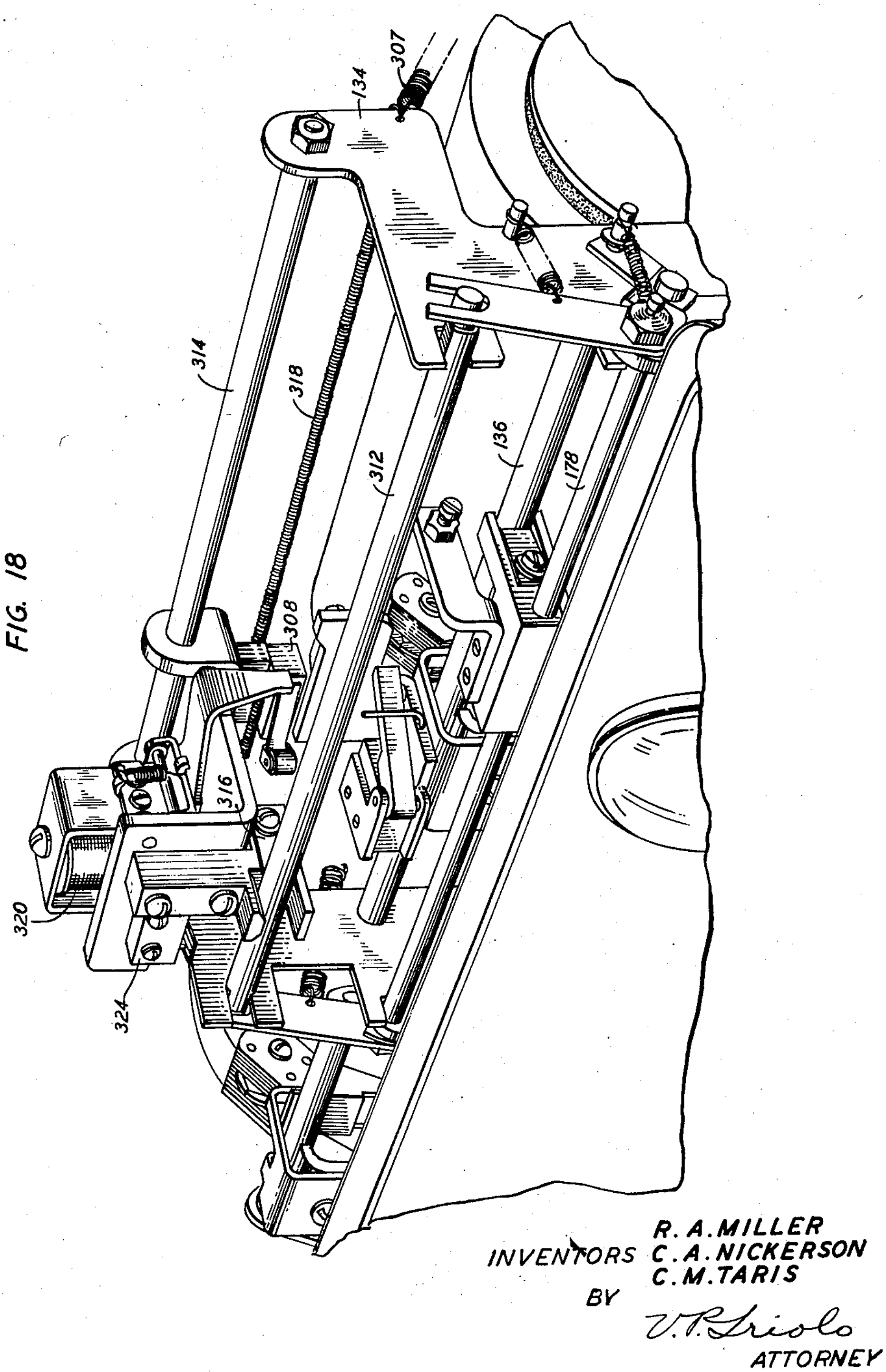
Fig. 18 is a view in perspective of the incoming message transducer carriage and playback index carriage.

When the subscriber calls in from a remote location for the first time after leaving the station, solenoid 306 will be energized, bail 134 will be rotated about its pivot and half-nut 122 will be disengaged from lead screw 124. Scan motor 300 will also be energized and will drive carriage 116 back to the initial position. As this point is reached, a suitable switch, such as microswitch 308 on the "playback index" carriage 310 (Figs. 12 and 36), will be operated by the motion of carriage 116 to deenergize solenoid 306 and scan motor 300, and allow half-nut 122 to reengage lead screw 124 under the operation of the bail return springs 307 (Fig. 18).

The machine will commence its playback at the beginning of the first recorded incoming message. The subscriber may elect to hear all the messages which have been recorded, or he may elect to hang up before hearing all the messages. In the former case, when the transducer carriage has traversed the entire recorded length of the drum, switch 166 mounted on said carriage will be operated by member 168 on "pilot" or last message indexing carriage 170 and the machine will be dropped off the telephone line. In the latter case, it will be necessary to restore the transducer carriage to the end of the last recorded message in order to enable the machine to accept more messages. This is accomplished on the subscriber's hangup whereupon solenoid 306 and scan motor 300 are energized. Half-nut 122 will become disengaged from lead screw 124 and motor 300 will rotate in a reverse direction so as to drive the transducer carriage away from the starting point and toward member 168 mounted on "pilot" carriage 170. Switch 166 opens to deenergize relay 169. Contact 167 of relay 169 will open to deenergize relay 286, solenoid 306 and scan motor 300.

As already indicated, the machine may be constructed so that on all calls subsequent to the first, the transducer carriage will return to the point of recording last heard rather than to the beginning of the first message. As a practical matter, the transducer carriage may be returned to a point somewhat beyond the point of recording last heard, for some finite distance, e. g., one minute, two messages, or one message, so that the subscriber will hear a very short section of the last previously heard message and then the new matter.

Figure 13:
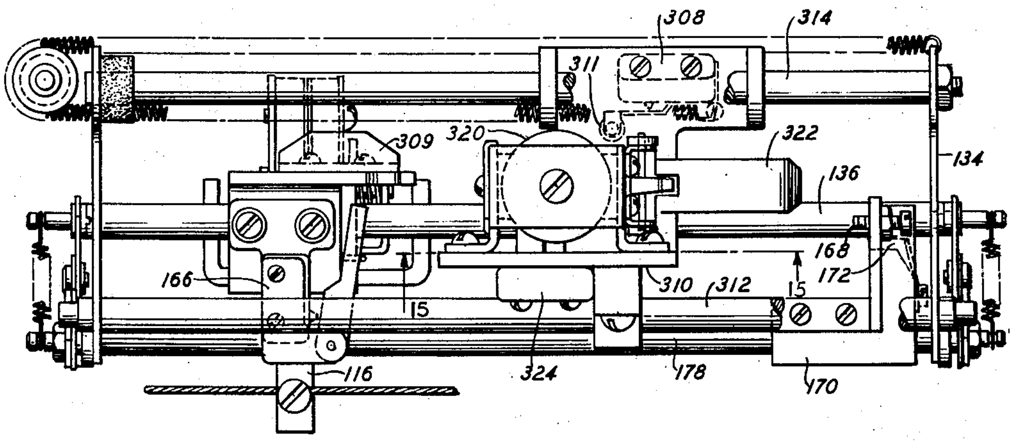
Fig. 13 is a plan view of the carriage mechanism shown in Fig. 12.

To accomplish this "playback index" carriage 310 is provided. This carriage is supported and guided by slide bars 312 and 314 which are similar to and are structurally coupled to the corresponding slide bars 178 and 136 of carriage 170 (Fig. 13). Slide bars 312 and 314 are moved toward or away from each other by the mechanism which controls the relative movement of slide bars 178 and 136. Carriage 310 also has a locking spring 316, normally pressed against slide bar 312 on bail 134 with sufficient friction to hold it in position but not enough to prevent transducer carriage 116 from pushing it ahead (as explained hereinafter) during the playback of messages. Carriage 310 is released at the same time carriage 170 is released, that is, just before the old messages are erased and the first new message is recorded. The release of carriage 310 is accomplished when solenoid 174 actuates arm 176 which in turn moves slide bar 312 away from slide bar 314. When released, carriage 310 is pulled to the zero position by means of coil spring 318.

Mounted on playback index carriage 310 are the solenoid 320 which controls the latch 322, microswitch 308 and solenoid locking switch 324 which is actuated by latch 322. Latch 322, which functions only during playback to a remote station (relay 268 must be operated to close contact 558), is engaged by transducer carriage 116 and the playback index carriage 310 is thereafter carried along by carriage 116.

When the subscriber makes his first call, transducer carriage 116 will be driven back to the initial position at which point it will operate microswitch 308 mounted on playback index carriage 310 and, for the first time, pick up playback index carriage 310. On subsequent calls, carriage 116 will be driven back to carriage 310 which will be at the position where it had been dropped by carriage 116 on termination of the previous call. Operation of switch 308 deenergizes scan motor 300 and solenoid 306, and energizes solenoid 320 which in turn actuates latch 322. When actuated, latch 322 operates switch 324 which locks up solenoid 320. Playback commences and playback index carriage 310 is carried forward by carriage 116 which engages latch 322. Playback starts at the point where microswitch 308 is operated. By shifting the position of microswitch 308 or the position of member 309 (on transducer carriage 116) which actuates switch 308 on contacting member 311 (Fig. 13) the distance to be traveled by carriage 116 before it engages latch 322 may be varied. This distance represents the portion of previously heard messages which will be repeated before the playback of new matter starts at the point where latch 322 is engaged. When the subscriber hangs up, latch 322 is disengaged from carriage 116 and carriage 310 remains in position being held by spring 316 (Fig. 18) which frictionally engages bar 312. Scan motor 300 and solenoid 306 are energized and as a result, carriage 116 travels to the end of the last recorded incoming message where it contacts carriage 170, causes switch 166 to open and thereby again deenergizes scan motor 300 and solenoid 306.

Where calling party disconnect facilities are not available and the subscriber calls his number for a remote playback of the incoming calls, playback will always commence with the first incoming message. Once this sequence has been initiated, the reproduction will continue until all messages are played back. The subscriber may, of course, disconnect at any time, but the machine will not know this and consequently will continue operation until it has reached the end of the last recorded message. At this point new incoming calls will be accepted.

In the manner to be described more specifically hereinafter, the erase cycle starts automatically as soon as the second number of the two-party line is called. The telephone line is seized momentarily and two tone beeps are transmitted. These signal tones indicate to the subscriber that he has reached the correct number and that the erase cycle has started. The subscriber hangs up after hearing the signal tones. Once the erasure sequence is started it cannot be stopped. The incoming message drum is erased of previous recording and the mechanisms including carriages 116, 170 and 310 are so disposed as to accept incoming calls and to record messages starting at the beginning of the magnetic record. The erase procedure will be carried out irrespective of the availability of calling party disconnect facilities.

*Circuits under control of the subscriber at the "home" station.—Announcement-dictate.*—With the on-off switch 326 on and the function switch knob 77 (Fig. 1) turned to announcement-dictate, power is applied to relay 328 over conductor 330, normal contact 332 of relay 268 (Fig. 33) and conductor 334 (Fig. 36). The ready lamp 336 lights when power is supplied through switches 250 and 152, normal contact 338 of relay 274, resistor R–207 and over conductor 340 through operated contact 327 of relay 328 to ground. When start switch 342 (Fig. 35) is momentarily pressed, relay 266 operates and locks through the stop switch 344, switch 248, switch 156 (Fig. 33), switch 74 and resistor R–211. Relay 266 operates relay 274, starting the motor 8, applying amplifier power and extinguishing ready lamp 336 (Fig. 36). Relay 266 operates solenoid 82 (Fig. 33), the announcement erase solenoid by supplying power through switch 257 and solenoid 82 moves the erase coil 90 close to the talk-out drum 18 and releases the adjustable limit switch holding mechanism 80 which allows switch 74 to drop back to the minimum announcement position. Erase current is supplied through switch 98. Relay 266 operates relay 262 by supplying power through switch 259 and operated contact 462 of relay 266. Relay 262 operates solenoid 50 by supplying power through its operated contact 346 and switch 245 starting the drum and cam rotation. Relay 262 operates relay 276 to open contact 347 and restore the filament current in tubes V4 and V5 and thereby start the bias oscillator and activate the automatic volume control circuits. Relay 276 connects the talk-out transducer 36 to the amplifier-bias oscillator output over a path which includes conductor 348, normal contact 350 of relay 268, switch 242, conductor 476, operated contact 352 of relay 276 and conductor 354. It connects the telephone set to the amplifier input over a path which includes conductors 356 and 358, switches 251, 252 and 246, conductors 360 and 362, transformer T2, conductor 364, operated contact 366 of relay 276 and conductor 368.

After one drum revolution, about 3 seconds, the mechanical trip mechanism comprising the pin 100 and the latch 102 drops erase coil 90 and erase current is cut off by switch 103. Approximately one-half second later, the dictate lamp 370 lights through resistor R–206, switch 258, conductor 372 and switch 374 operated by cam 196. The talk-out message is recorded on drum 18. During the recording of the message the adjustable limit switch 74 is moved physically by the transducer carriage 60.

At the end of the talk-out message, the subscriber operates the stop switch 344 momentarily. Relay 266 releases, releasing solenoid 82 and thereby clamping the adjustable limit switch 74 by means of the pad 80 in a position corresponding to the end of the talk-out message. The transducer carriage 60 and the cams 192, 194 and 196 return to standby position. Relay 274, however, remains energized through switch 72 until the drum 18 is indexed because switch 72 is held closed by the clutch pawl 52 until the indexing takes place.

If the stop switch 344 is not operated by the subscriber, the adjustable limit switch 74 will operate at the limit of its travel (about 30 seconds) and release relay 266.

The telephone answering device is restored to standby and the ready lamp 336 is lighted.

*Announcement-check.*—With the on-off switch 326 in the on position power is applied to relay 328 over conductor 330, contact 332 of relay 268 and conductor 334. With the function switch knob 77 at announcement-check, the ready lamp 336 is lighted when power is supplied through switches 250 and 152, normal contact 338 of relay 274, resistor R–207 and over conductor 340 through operated contact 327 of relay 328 to ground. When start switch 342 is momentarily operated relay 266 operates and locks up through stop switch 344, switch 248, switch 156, adjustable limit switch 74 and resistor R–211. Relay 266 operates relay 274, starting motor 8, applying power to the amplifier and extinguishing the ready lamp 336. Relay 266 also operates the talk-out drum clutch solenoid 50 over a path which includes conductor 376, switch 244, conductor 378, normal contact 380 of relay 262 and conductor 382.

The talk-out transducer 36 is connected to the amplifier input over the path which includes conductor 348, normal contact 350 of relay 268, switch 243, conductor 384, normal contact 386 of relay 276 and conductor 368. The amplifier output is connected to the telephone set over the path which includes transformer T1, conductor 388, normal contact 390 of relay 276, conductor 392, transformer T2, conductors 360 and 362, switches 246, 251 and 252, conductors 356 and 358 and operated contacts of relay 328. Cams 192, 194 and 196 rotate but perform no operating functions.

At the end of the talk-out message the adjustable limit switch 74 operates, releasing relay 266 and solenoid 50. The transducer carriage 60 and the cams 192, 194 and 196 return to standby positions. If stop switch 344 is operated before switch 74 operates, relay 266 is immediately released. Relay 274 will remain energized through switch 72 until the talk-out drum is indexed, as explained in connection with the previously described announcement-dictate function, whereupon relay 274 is released and the ready lamp 336 is lighted.

*Message playback.*—With the on-off switch 326 in the on position power is applied to relay 328 over conductor 330, contact 332 of relay 268 and conductor 334. With function switch knob 77 at message playback and start switch 342 momentarily operated, relay 266 operates and locks through stop switch 344, switches 248, 156 and 74, and resistor R–211. Relay 266 operates relay 274, starting motor 8, energizing the amplifier and extinguishing the ready lamp 336. Relay 266 operates the talk-in drum clutch solenoid 104 over the path which includes conductor 394, switch 244, conductor 378, normal contact 380 of relay 262 and conductor 382.

The talk-in drum 20 and cams 198, 200 and 202 rotate. The cam rotation is incidental, no operating function being performed by it, in this case.

The subscriber selects the message to be played back from talk-in drum 20 with the scanning knob 144 which must be pushed inward before it can be turned. The indicator dial 160 remains stationary and serves as an index for the location of the end of the last recorded incoming message, and the amount of space remaining for recording.

The talk-in transducer 114 is connected to the amplifier input over the path which includes conductor 396, contact 398 of relay 268, switch 243, conductor 384, contact 386 of relay 276, and conductor 368. The amplifier output is connected to the telephone set over the path which includes transformer T1, conductor 388, contact 390 of relay 276, conductor 392, transformer T2, conductors 360 and 362, switches 246, 251 and 252, and conductors 356 and 358 and operated contacts of relay 328.

The talk-in drum 20 is stopped by operation of the stop switch 344 or by operation of the limit switch 156. Switch 156 opens when the transducer carriage 116 reaches the end of the record medium 112 on drum 20, and has the same effect as operating switch 344 except that switch 156 remains open until the carriage 116 is manually returned by means of scanning knob 144 to a position other than the end of the record medium 112.

*Automatic answer.*—With the on-off switch 326 in the on position power is applied to relay 328 over conductor 330, contact 332 of relay 268 and conductor 334. With function switch knob 77 at automatic answer, and the talk-in transducer in position to receive a message other than the first incoming message, switches 152, 154, 156 are closed and switch 166 operated; and the ready lamp 336 is lighted when power is supplied through switch 152, normal contact 171 of relay 169, contact 338 of relay 274 and over conductor 340 through operated contact 327 of relay 328 to ground. (The erasing process involved in the recording of the first incoming message will be described hereinafter.)

Ringing current operates relay 264 over a path from R through relay 328, conductor 408, conductor 406, condenser 401, thermistor 403, relay 264 winding, normal contact 506 of relay 280, conductor 504, switches 446, 154, 255 and 256, conductor 501, normal contact 498 of relay 280, and conductor 496 to the terminal strip ground. Relay 264 locks up through resistor R–203, conductor 410, contact 412 of relay 262, conductor 414, switch 416 of cam 194, conductor 418 and switch 420 of cam 198.

Relay 264 operates relay 266 through conductor 422. Relay 266 operates relay 274, starting motor 8, energizing the amplifier and extinguishing the ready lamp 336.

Relay 266 operates solenoid 50 over a path which includes conductor 376, switch 244, conductor 378, contact 380 of relay 262 and conductor 382. The talk-out drum and cams 192, 194 and 196 rotates.

Approximately 3½ seconds after the first ring, switch 424 of cam 192 completes termination of the telephone line over a path which includes conductors 408 and 406, switch 424 of cam 192, conductors 426 and 428, the winding of relay 278, conductor 430, switch 432 of cam 194, conductor 434, contact 436 of relay 262, conductor 438, switch 251, conductors 440 and 400 and contacts of relay 328.

Relay 278, the "calling party disconnect" relay, operates and holds independent of switch 432 and relay 262 by closing its contact 442.

The talk-out transducer is connected to the amplifier input over a path which includes conductor 348, contact 350 of relay 268, switch 243, conductor 384, contact 386 of relay 276 and conductor 368. The amplifier output is connected to the line through transformer T1, conductor 388, contact 390 of relay 276, conductor 392, transformer T2, conductors 360 and 362, switches 246, 251 and 252, and conductors 440 and 426, switch 424 of cam 192, conductor 408, and relay 328. About one second after the telephone line is terminated cam 194 opens switches 432 and 416 making line termination dependent on the holding of relay 278 through its contact 442 and switches 424 and 251, and the lockup of relay 264 dependent on contact 444 of relay 278. Any interruption of central office power will cause relay 278 to release which would open its contact 444 and cause the telephone answering device to return to standby condition by the release of relay 264 which also releases relays 266 and 274.

If a calling party disconnects during the talk-out message, the open contacts of switch 446 (opened by the operation of solenoid 50) will break the telephone ground circuit (conductor 496, contact 498 of relay 280, conductor 501, switches 256 and 255, conductor 502, switch 154, switch 446, conductor 504, contact 506 of relay 280, conductor 508, winding of relay 264, thermistor 403, condenser 401 and conductors 406 and 408 and relay 328) and prevent a new call being received until the talk-out drum is indexed.

At the end of the talk-out message adjustable limit switch 74 operates relay 262 over a path which includes conductor 448, switch 254, conductor 450, closed contact 452 of switch 74, conductors 454, 456 and 458 and rectifier 296. Relay 262 closes contact 460 and locks up through contact 462 of relay 266 and conductors 464 and 458, and contact 466 of operated relay 262 takes over the job of holding the telephone line from switch 424 of cam 192. The solenoid 50 is released by the opening of contact 380 of relay 262 due to the operation of relay 262 and the talk-out drum and cams 192, 194 and 196 return to standby or normal positions.

The relay 278 remains under the control of central office power.

Solenoid 104 is operated through contact 346 closed by the operation of relay 262 and switch 245. The pawl 106 is disengaged from the slot 108 in talk-in drum 20 and the talk-in drum and cams 198, 200 and 202 start rotating. Relay 276 is operated over a path which includes contact 468 of relay 262, conductor 470, contact 472 of relay 268 and conudctor 474.

The telephone line is connected to the input of the amplifier via relay 328 over conductors 408 and 400, 426 and 440, operated contact 466 of relay 262, switches 252, 251 and 246, conductors 360 and 362, transformer T2, conductor 364, contact 366 of relay 276 and conductor 368. The amplifier output is connected to the talk-in transducer 114 through transformer T3, conductor 354, contact 352 of relay 276, conductor 476, switch 242 conductor 478, contact 398 of relay 268 and conductor 396.

Cam 200 operates switch 480 about one-half second after limit switch 74 operates, thereby connecting the output of power rectifier 298 to the anode of the beep tone amplifier V6 through conductor 482, switch 480, conductors 484 and 485, contact 487 of relay 276, conductor 489, contact 488 of relay 268 and conductor 490. The input to the beep tone amplifier V6 is obtained from the beep tone generator 292 through switch 492 of cam 202 and conductor 483. The beep tone level is controlled by the voltage dividers R–205 and R–204, the level of the first three beep (the first two, one second apart, to indicate that the incoming message may be recorded and the third, 25 seconds after the second, to indicate the approach of the end of the maximum recording time) is set to give a level of about −10 decibels (as referred to one milliwatt) on the line. Cam 202 closes switch 494 at the same time as the last of four lobes on cam 200 closes switch 480 to increase the level of the last or fourth warning beep to about −5 decibels (as referred to one milliwatt). The fourth beep follows the third beep by about one second.

The talk-in message is recorded on talk-in drum 20.

Cam 200 operates switch 480 again about 25 seconds after recording starts, sending the third and fourth beeps out on the line in the same manner as the first and second beeps.

As described above, cam 202 operates switch 494 and overlaps the fourth operation of switch 480 by cam 200 so that the fourth and last beep is 5 decibels higher in level than the others and follows the third after a one-second interval.

Switch 420 of cam 198 releases relay 264 about 2½ seconds after the last beep tone is transmitted, allowing a total of 30 seconds recording time including transmission of beep tones.

All relays release, the motor 8 stops, the talk-in drum 20 stops and the cams 198, 200 and 202 return to standby or zero position.

The telephone line is released and the device is ready to answer another call.

If the telephone line current is interrupted for a short time, as by calling party disconnect, before the 30-second incoming message recording time has elapsed, relay 278 releases as described heretofore, stopping all motion and restoring the device to standby. Ringing current will be necessary to set the device in motion again.

When the talk-in transducer 114 reaches the point on drum 20 where enough record medium remains for only 35 seconds of message recording, switch 152 is opened by cam 148 and the ready lamp will not light. A short distance further on the talk-in drum, equivalent to 5 seconds of message recording, switch 154 breaks the telephone ground circuit (referred to above) and a "don't answer" condition is presented to subsequent calls. After the transducer 114 traverses an additional distance, equivalent to 30 seconds of message recording, switch 156 opens. Switch 156 opens the lock-up circuit of relay 266 which does not allow solenoid 104 to become energized so that the transducer 114 cannot run off the end of the drum 20 if the subscriber starts to play back without turning the scanning knob 144 toward zero.

As already indicated, the present invention is designed to function with "calling party disconnect" facilities. At locations where this facility is not available, the machine will operate normally, without intrenal modifications, but on a fixed time talk-in message basis, i. e., the talk-in message drum will run its full cycle, 30 seconds, whether or not the calling party completes his message and disconnects in less than the allotted time.

*Erasure of talk-in messages.*—With the on-off switch 326 in the on position and the function switch knob 77 at automatic answer, the message scanning knob 144 and the indicator dial 160 are turned to the extreme counterclockwise zero position. This operation closes switch 162.

When switch 162 closes, the second winding of relay 272 is energized by supplying power over the path which includes switch 162, conductor 496, resistor R–303, conductor 498 and switch 500 on cam 192.

Relay 272 operates and energizes relay 282 by providing power over conductor 502, and relay 266 by providing power over conductor 516.

On operating, relay 282 energizes solenoid 104 by providing power over conductor 394, and solenoid 174 by providing power over conductor 518.

On operating, relay 266 energizes solenoid 50 by providing power over the path which includes conductor 382, contact 380 of relay 262, conductor 378, switch 244 and conductor 376, and energizes relay 274 by providing power over conductors 526, 464 and 458.

With solenoids 50 and 104 operated and relay 274 energized both drums and all cams are rotated by motor 8.

As described hereinbefore, solenoid 174, on operating, actuates arm 184 which moves erase coil 182 close to the record medium on drum 20. The erase current is turned on by switch 190 which closes as arm 184 is actuated. Carriage 170 is released and returned to zero position by spring 318.

The erase cycle is timed by cam 192 through switch 500. When switch 500 opens, relay 272 is deenergized and relay 266 and 282 are dropped.

*Message playback under control from a remote station.*—The function switch knob 77 is turned to automatic answer. With the on-off switch 326 turned on alternating-current power is applied to the unit and relay 328 is energized by power applied over the path which includes conductor 330, contact 332 of relay 268 and conductor 334.

The ready lamp 336 is energized in the manner previously described and the answering device is in stand-by condition.

The telephone ring comes through on conductor T' and ground.

Relay 270 responds to the ringing current and locks up through the previously described holding circuit for relay 264, namely, conductor 410, relay 262, conductor 414, switch 416, conductor 418 and switch 420.

Relay 268 is energized by power provided over conductor 520. On operating, relay 268 opens contact 332 and releases relay 328.

Relay 266 is energized by power provided through contact 522 of relay 268 and over conductor 516. Relay 274 is energized by power provided through contact 524 of relay 266 and over conductor 526.

In the manner previously described, the operation of relays 266 and 274 energizes solenoid 50 and motor 8. Announcement drum 18 and cams 192, 194 and 196 rotate.

Relay 280 is energized by power provided through contact 528 of relay 266 and over conductor 530. Operation of relay 280 opens contacts 498 and 532 thereby breaking the telephone ground continuity held through conductor 534, contact 532, conductor 536, switch 256, conductor 501, contact 498 and conductor 496.

Relay 278, the calling party disconnect responsive relay, then seizes the telephone line by means of the path which includes conductor 400, conductor 440, switch 251, conductor 438, contact 436 of relay 262, conductor 434, switch 432 of cam 194, conductors 430, 428 and 426, switch 424 of cam 192 and conductor 408 and relay 328.

Relay 284 is energized by power provided over switch 253, conductor 538, switch 324, switch 308, conductor 540, contact 542 of relay 270 and conductor 544.

Solenoid 306 is energized by power provided through contact 546 of relay 284 and over conductor 548 and resistor R–306. Solenoid 306 operates to rotate bail 134 and disengage half-nut 122 from lead screw 124.

Scan motor 300 is energized by power from source 550 provided over conductors 552 and 554, and through contact 556 of relay 284. Motor 300 drives carriage 116 back to its initial position. As this point is reached, microswitch 308 on the "playback index" carriage 310 is operated (contact 562 is closed) by the motion of carriage 116 to deenergize relay 284, motor 300 and solenoid 306 and allow half-nut 122 to reengage lead screw 124.

Operation of microswitch 308 also energizes solenoid 320 by providing power over the path which includes operated contact 558 of relay 268, conductor 560, resistor R–300, operated contact 562 of switch 308, conductor 564, contact 566 of switch 324, conductor 538 and switch 253. Solenoid 320 operates and actuates latch 322 which, in turn operates switch 324 to lock up solenoid 320 through contact 568 of switch 324 and conductor 538, and holds relay 284 deenergized.

About 3.5 seconds after the start of the first telephone ring switch 570 of cam 196 closes. Relay 262 is then energized by power provided from rectifier 296 through contact 462 of relay 266 and over conductors 572 and 574, contact 576 of relay 268, conductor 578 and conductor 448. Drum 18 indexes when contact 380 of relay 262 opens. In the manner previously described relay 276 operates, solenoid 104 is energized and drum 20 and cams 198, 200 and 202 rotate.

Playback commences and "playback index" carriage 310 is carried forward by carriage 116 which engages latch 322. The messages on the incoming message drum 20 are reproduced and transmitted to the telephone line R′ and T′ from amplifier output transformer T2, over conductors 360 and 362, switches 246, 251 and 252, conductors 426 and 440, switch 424 and conductors 408 and 400 and relay 328.

Relay 268 also takes the telephone line release control away from switch 420 of cam 198 by completing the path to conductor 418 from power source 173 through contact 171 of operated relay 169, conductor 580, contact 582 of relay 268 and conductor 584. Relay 169 operates as soon as motor 300 starts to drive carriage 116 toward start of record. Relay 169 operates through switch 166 and conductor 177. If the subscriber calling from a remote station hangs up before the last message recorded on the incoming message drum is played back to him, calling party disconnect responsive relay 278 is deenergized and drops out.

Contact 444 of relay 278 opens and the holding circuit for relay 270 is broken. Relay 270 is deenergized and as a result, relay 268 is also deenergized.

The release of relay 268 opens the locking circuits for relays 262 and 266. Relays 262 and 266 also drop out. Solenoid 104 is deenergized and drum 20 and cams 198, 200 and 202 stop rotating. Release of relay 266 drops out relay 280.

The release of relay 268 and opening of contact 558 cause solenoid 320 to become deenergized. As a result, latch 322 is released. Release of latch 322 allows "playback index" carriage 310 to remain in this position while message transducer carriage 116 is driven forward to the last recorded message position.

Relay 286 is energized, as solenoid 320 becomes deenergized, by power connected through switch 253, conductor 465, contact 167 of relay 169, conductor 586, contact 588 of relay 268, conductor 590, contact 592 of relay 284 and conductor 594. Contacts 596 and 598 of relay 286 are closed to start motor 300 and energize solenoid 306. Solenoid 306 rotates bail 134 to disengage half-nut 122 from lead screw 124. Scan motor 300 reverses by the closing of contact 595 of relay 286 and drives carriage 116 toward pilot carriage 170, carriage 170 being located at the position which corresponds to the end of the last message recorded on drum 20. When switch 166, which is mounted on carriage 116, comes in contact with member 168 mounted on carriage 170 it opens. On opening, switch 166 causes relay 169 to become deenergized. This causes contact 167 to open which results in the release of relay 286. Scan motor 300 and solenoid 306 are deenergized.

The release of relay 268 also causes relay 328 to become reenergized.

All motion ceases, the ready lamp lights and the device is ready to accept another incoming message or another call from the subscriber at the remote station.

If the subscriber calling from a remote station stays on the line until the last recorded message is played back to him, switch 166 will open on contacting member 168 on carriage 170. On opening, switch 166 will cause relay 169 to become deenergized. As a result, contacts 167 and 171 will open. The opening of contact 171 will open the holding circuit for relay 270. Relay 270 will drop out and the release sequence already described will be followed. Relay 286 will not be energized since carriage 116 is already resting in the proper position to accept new incoming messages (it has contacted carriage 170 and switch 166 and contact 167 are open).

*No calling party disconnect facility.*—If this facility were not provided, the operational sequences described hereinbefore would be valid with the exceptions that relay 278 would not control the release of relay 270 and the playback index feature would not be made available. Every remote message playback would start with the first message recorded on the incoming message drum 20 and would continue to the end of the last recorded message.

Whether or not calling party disconnect facilities are available switches 152 and 154 (as previously described) will partially disable the device when the incoming message drum has been fully recorded. Further calls from the incoming message telephone line will not be accepted. However, the subscriber calling from a remote station will be able to call in for playback of the messages from a completely filled drum. Also, as will be described hereinafter, he will be able to erase the incoming message drum and thereby prepare it to accept further incoming messages.

*Erasure under control from a remote station.*—The function switch knob 77 is turned to automatic answer. With the on-off switch 326 turned on, power is applied to the unit and relay 328 is energized. The device is in stand-by condition.

The telephone ring comes through on conductors R' and ground.

Relay 272 responds to the ringing current and locks up through the holding circuit for relays 270 and 264, namely, conductor 410, contact 412 of relay 262, conductor 414, switch 416 (cam 194), conductor 418 and switch 420 (cam 198), and conductor 498 and switch 500 (cam 192).

Relay 272 operates and energizes relay 282 by providing power over conductor 502, and relay 266 by providing power over conductor 516.

On operating, relay 282 energizes solenoid 104 by providing power over conductor 394, and solenoid 174 by providing power over conductor 518.

On operating, relay 266 energizes solenoid 50 by providing power over the path which includes conductor 382, contact 380 of relay 262, conductor 378, switch 244 and conductor 376, and energizes relay 274 by providing power from rectifier 296 over conductors 458, 464 and 526.

With solenoids 50 and 104 operated and relay 274 energized, motor 8 rotates all cams and both drums.

Solenoid 174, on operating, actuates arm 184 which moves erase coil 182 close to the record medium on drum 20. The erase current is turned on by switch 190 which closes as arm 184 is actuated. Carriages 170 and 310 are released and returned to the zero position by spring 318.

Relay 284 is energized by power provided over switch 253, conductor 538, switch 324, conductor 564, contact 600 of relay 272, conductor 602 and conductor 544.

Solenoid 306 and motor 300 are energized through contacts 546 and 556 of relay 284. Motor 300 drives the carriage 116 back to its start position on drum 20.

As soon as relay 282 operates, two signal tones are transmitted to the telephone line. These signal tones advise the calling subscriber that he has reached the correct number and that the erase cycle has started. The operation of relay 282 closes contact 486 and, on the closing of switch 480 by cam 200, voltage is supplied to the anode of the signal tone amplifier V6 over the path which includes rectifier 298, conductor 482, switch 480, conductor 484, contact 486 of relay 282, conductor 604, contact 488 of relay 268, conductor 490, and the winding of transformer T2. The output of amplifier V6 is transmitted to the calling subscriber over the path which includes a secondary winding of transformer T2, conductor 392, contact 390 of relay 276, conductor 388, the winding of transformer T1, conductors 606 and 608, contacts 610 and 612 of relay 272 and conductors T' and R'. Once the erase cycle is started nothing can be done from a remote location to stop it.

The erase cycle is timed by cam 194 through switch 416. About 3½ seconds after the start of the first telephone ring, switch 416 opens and breaks the holding circuit for relay 272.

Relay 272, on being deenergized, drops the telephone line and relays 266 and 282. All motion ceases.

It is to be understood that the above-described arrangements are illustrative of the application of the principles of the invention. Other arrangements may be devised by those skilled in the art without departing from the spirit and scope of the invention. For example, while in the embodiment of the invention shown in the drawings the contact closures which start the remote control playback cycle and the remote control erase cycle are achieved by energizing control relays 270 and 272 respectively through a ringing current signal transmitted over a conductor of the telephone line through the relay winding to ground, these contact closures may also be accomplished by other signals transmitted over the telephone line which will energize the relays controlling the remote play back and erase functions.

What is claimed is:

1. In an automatic telephone answering and message recording system, a device for storing telephone messages, said device comprising a rotatable drum and a transducer for recording and reproducing said messages, said transducer being supported on a carriage adapted to traverse said drum axially, driving means adapted to rotate said drum and simultaneously impart said axial motion to said carriage when engaged therewith, means for actuating said carriage toward said drum to engage said driving means and away from said drum to become disengaged from said driving means, means for imparting axial motion to said carriage when disengaged from said driving means, said means including a motor, a first pulley adapted to be rotated by said motor, a second pulley attached to said carriage and an endless cable riding over said pulleys.

2. In an automatic telephone answering and message recording system, a home station, distant stations, means at said home station for storing telephone messages received from said distant stations, means at said home station for playing back said stored messages to a distant station, a telephone line connected to said home station, means responsive to a signal transmitted over said line for the first time for automatically conditioning said playback means to play back said stored messages from the beginning of the first stored message, means responsive to a disconnect condition established at said distant station for terminating the playback of said stored messages, said termination occurring after a portion of said stored messages has been played back, means responsive to said signal transmitted over said line subsequent to said first time for automatically conditioning said playback means to play back said stored messages from a point corresponding to the end of the last previously played back portion of said stored messages.

3. In an automatic telephone answering and message recording system, a home station, distant stations, means at said home station for storing telephone messages received from said distant stations and playing back said stored messages to a distant station, said means comprising a record medium and a transducer for recording and reproducing said messages, a first carriage supporting said transducer, a second carriage for indexing the last previously reproduced message and a third carriage for indexing the last recorded message, said second carriage being engaged by said first carriage during the play back of messages, said third carriage being engaged by said first carriage during the recording of messages, a telephone line connected to said home station, means responsive to a signal transmitted over said line for imparting motion to said first carriage in a reverse direction toward said second carriage, first switch means adapted to be actuated when said first carriage comes in contact with said second carriage, means responsive to said actuated switch means for arresting the reverse motion of said first carriage, for latching said second carriage to said first carriage, for conditioning said transducer to reproduce said stored messages and for imparting forward motion to said first and second carriages toward said third carriage, second switch means adapted to be actuated when said first carriage comes in contact with said third carriage, means responsive to said actuated switch means for arresting the motion of and disengaging said first and second carriages.

4. An automatic telephone answering and message recording system in accordance with claim 3 wherein the point at which play back starts is the point at which said first switch means is actuated, and said switch means is adjustable to control the distance traveled by said first carriage in a forward direction before said second carriage becomes latched thereto, thereby determining the portion of previously played back messages to be repeated prior to the play back of other messages.

5. In an automatic telephone answering and message recording system a home station, distant stations, means at said home station for storing telephone messages received from said distant stations and playing back said stored messages to a distant station, said means comprising a record medium and a transducer for recording and reproducing said messages, a first carriage supporting said transducer, a second carriage for indexing the last previously reproduced message and a third carriage for indexing the last recorded message, said second carriage being engaged by said first carriage during the play back of messages, said third carriage being engaged by said first carriage during the recording of messages, a first driving means, a second driving means, a telephone line connected to said home station, means responsive to a signal transmitted over said line for energizing said first driving means to impart motion to said first carriage in a reverse direction toward said second carriage, a first switch means adapted to be actuated when said first carriage comes in contact with said second carriage, means responsive to said actuated switch means for arresting the reverse motion of said first carriage, for latching said second carriage to said first carriage, for conditioning said transducer to reproduce said stored messages and for conditioning said second driving means to impart forward motion to said first and second carriages toward said third carriage, means responsive to a disconnect condition established at said distant station for deenergizing said second driving means to arrest the motion of and disengage said first and second carriages, and for conditioning said first driving means to impart forward motion to said first carriage toward said third carriage, second switch means adapted to be actuated when said first carriage comes in contact with said third carriage, means responsive to said actuated switch means for arresting the motion of said first carriage.

6. In an automatic telephone answering and message recording system, a home station, distant stations, a device at said home station for storing telephone messages received from said distant stations, said device comprising a rotatable record drum, means for playing back said stored messages to a distant station, said means comprising a transducer supported on a first carriage adapted to traverse said drum axially and to be actuated toward and away from said drum, a feed screw, driving means for rotating said drum and said feed screw, said feed screw engaging said first carriage when actuated toward said drum to impart axial motion thereto in a forward direction away from its initial starting position, second and third carriages adapted to traverse said drum axially in said forward direction when engaged by said first carriage, said second carriage being engaged by said first carriage during the playback of messages, said third carriage being engaged by said first carriage at a point corresponding to the end of the last recorded message after playback has been completed, latching means for engaging said first and second carriages, a telephone line connected to said home station, means responsive to a signal transmitted over said line for energizing said driving means to rotate said drum and feed screw, means energized through said signal responsive means for actuating said first carriage to disengage it from said feed screw and for imparting axial motion thereto in a reverse direction toward said second carriage, a first switch on said second carriage adapted to be actuated by said first carriage traveling in said reverse direction, first means responsive to said actuated first switch for arresting the motion of and actuating said first carriage toward said drum to engage said feed screw, second means responsive to said actuated first switch for actuating said latching means to engage said first and second carriages, a second switch on said third carriage adapted to be actuated by said first carriage traveling in said forward direction, first means responsive to said actuated second switch for actuating said latching means to disengage said second and first carriages, second means responsive to said actuated second switch for deenergizing said driving means and arresting the motion of said first carriage.

7. An automatic telephone answering and message recording system in accordance with claim 6 wherein the point at which play back starts is the point at which said first switch is actuated, and said switch is adjustable to control the distance traveled by said first carriage in a forward direction before said second carriage becomes latched thereto, thereby determining the portion of previously played back messages to be repeated prior to the play back of other messages.

8. In an automatic telephone answering and message recording system, a home station, distant stations, a device at said home station for storing telephone messages received from said distant stations, said device comprising a rotatable record drum, means for recording said messages and playing back said messages to a distant station, said means comprising a transducer supported on a first carriage adapted to traverse said drum axially and to be actuated toward and away from said drum, a feed screw, driving means for rotating said drum and said feed screw, said feed screw engaging said first carriage when actuated toward said drum to impart axial motion thereto in a forward direction away from its initial starting position, second and third carriages adapted to traverse said drum axially in said forward direction when engaged by said first carriage, said second carriage being engaged by said first carriage during the playback of messages, said third carriage being engaged by said first carriage during the recording of a message and at a point corresponding to the end of the last recorded message, latching means for engaging said first and second carriages, first and second telephone lines connected to said home station, means responsive to a signal transmitted over said first line for energizing said driving means to rotate said drum and feed screw, means energized through said signal responsive means for actuating said first carriage to disengage it from said feed screw and for imparting axial motion thereto in a reverse direction toward said second carriage, a first switch on said second carriage adapted to be actuated by said first carriage traveling in said reverse direction, first means responsive to said actuated first switch for arresting the motion of and actuating said first carriage toward said drum to engage said feed screw, second means responsive to said actuated first switch for actuating said latching means to engage said first and second carriages, a second switch on said third carriage adapted to be actuated by said first carriage traveling in said forward direction, first means responsive to said actuated second switch for actuating said latching means to disengage said first and second carriages, second means responsive to said actuated second switch for deenergizing said driving means and arresting the motion of said first carriage, means responsive to a signal transmitted over said second line for reenergizing said driving means and conditioning said system for the recording of an additional message.

9. In an automatic telephone answering and message recording system, a home station, distant stations, a device at said home station for storing telephone messages received from said distant stations, said device comprising a rotatable record drum, means for playing back said stored messages to a distant station, said means comprising a transducer supported on a first carriage adapted to traverse said drum axially and to be actuated toward and away from said drum, a feed screw, driving means for rotating said drum and said feed screw, said feed screw engaging said first carriage when actuated toward said drum to impart axial motion thereto in a forward direction away from its initial starting position, second and third carriages adapted to traverse said drum axially in said forward direction when engaged by said carriage, said second carriage being engaged by said first carriage during the playback of messages, said third carriage being engaged by said first carriage at a point corresponding to the end of the last recorded message, latching means for engaging said first and second carriages, a telephone line connected to said home station, means responsive to a signal transmitted over said line for energizing said driving means to rotate said drum and feed screw, means energized through said signal responsive means for actuating said first carriage to disengage it from said feed screw and for imparting axial motion thereto in a reverse direction toward said second carriage, a first switch on said second carriage adapted to be actuated by said first carriage traveling in said reverse direction, first means responsive to said actuated first switch for arresting the motion of and actuating said first carriage toward said drum to engage said feed screw, second means responsive to said actuated first switch for actuating said latching means to engage said first and second carriages, means responsive to a disconnect condition established at said distant station for deenergizing said driving means, for actuating said latching means to disengage said first and second carriages, for actuating said first carriage to disengage it from said feed screw and for imparting axial motion to said first carriage in a forward direction toward said third carriage, a second switch on said third carriage adapted to be actuated by said first carriage traveling in said forward direction, means responsive to said actuated second switch for arresting the forward motion of said first carriage.

10. In an automatic telephone answering and message recording system, a home station, distant stations, a device at said home station for storing telephone messages received from said distant stations, said device comprising a rotatable record drum, means for recording said messages and playing back said messages to a distant station, said means comprising a transducer supported on a first carriage adapted to traverse said drum axially and to be actuated toward and away from said drum, a feed screw, driving means for rotating said drum and said feed screw, said feed screw engaging said first carriage when actuated toward said drum to impart axial motion thereto in a forward direction away from its initial starting position, second and third carriages adapted to traverse said drum axially in said forward direction when engaged by said first carriage, said second carriage being engaged by said first carriage during the playback of messages, said third carriage being engaged by said first carriage during the recording of a message and at a point corresponding to the end of the last recorded message, latching means for engaging said first and second carriages, first and second telephone lines connected to said home station, means responsive to a signal transmitted over said first line for energizing said driving means to rotate said drum and feed screw, means energized through said signal responsive means for actuating said first carriage to disengage it from said feed screw and for imparting axial motion thereto in a reverse direction toward said second carriage, a first switch on said second carriage adapted to be actuated by said first carriage traveling in said reverse direction, first means responsive to said actuated first switch for arresting the motion of and actuating said first carriage toward said drum to engage said feed screw, second means responsive to said actuated first switch for actuating said latching means to engage said first and second carriages, means responsive to a disconnect condition established at said distant station for deenergizing said driving means, for actuating said latching means to disengage said first and second carriages, for actuating said first carriage to disengage it from said feed screw and for imparting axial motion to said first carriage in a forward direction toward said third carriage, a second switch on said third carriage adapted to be actuated by said first carriage traveling in said forward direction, means responsive to said actuated second switch for arresting the forward motion of said first carriage, means responsive to a signal transmitted over said second line for reenergizing said driving means and conditioning said system for the recording of an additional message.

11. An automatic telephone answering and message recording system in accordance with claim 10 wherein the means for imparting forward and reverse axial motion to said first carriage while disengaged from said feed screw comprises a reversible motor, a pulley adapted to be rotated by said motor, a second pulley attached to said carriage and an endless cable riding over said pulleys.

12. An automatic telephone answering and message recording system in accordance with claim 10 wherein the peripheral surface of said record drum is magnetizable and said transducer is a magnetic recording and reproducing head.

13. In an automatic telephone answering and message recording system, home station, distant stations, a device at said home station for storing telephone messages received from said distant stations, said device comprising a rotatable record drum, means for playing back said stored messages to a distant station, said means comprising a transducer supported on a first carriage adapted to traverse said drum axially and to be actuated toward and away from said drum, a feed screw, driving means for rotating said drum and said feed screw, said feed screw engaging said first carriage when actuated toward said drum to impart axial motion thereto in a forward direction away from its initial starting position, second and third carriages adapted to traverse said drum axially in said forward direction when engaged by said first carriage, said second carriage being engaged by said first carriage during the playback of messages, said third carriage being engaged by said first carriage at a point corresponding to the end of the last recorded message after playback has been completed, latching means for engaging said first and second carriages, a telephone line connected to said home station, means responsive to a signal transmitted over a first conductor of said line for energizing said driving means to rotate said drum and feed screw, means energized through said signal responsive means for actuating said first carriage to disengage it from said feed screw and for imparting axial motion thereto in a reverse direction toward said second carriage, a first switch on said second carriage adapted to be actuated by said first carriage traveling in said reverse direction, first means responsive to said actuated first switch for arresting the motion of and actuating said first carriage toward said drum to engage said feed screw, second means responsive to said actuated first switch for actuating said latching means to engage said first and second carriages, a second switch on said third carriage adapted to be actuated by said first carriage traveling in said forward direction, first means responsive to said actuated second switch for actuating said latching means to disengage said second and first carriages, second means responsive to said actuated second switch for deenergizing said driving means and arresting the motion of said first carriage, means for obliterating said stored messages, means responsive to a signal transmitted over a second conductor of said telephone line for conditioning said obliterating means to obliterate said messages.

14. In an automatic telephone answering and message recording system, a home station, distant stations, a device at said home station for storing telephone messages received from said distant stations, said device comprising a rotatable record drum, means for recording said messages and playing back said messages to a distant station, means for obliterating said messages, said recording and playback means comprising a transducer supported on a first carriage adapted to traverse said drum axially and to be actuated toward and way from said drum, a feed screw, driving means for rotating said drum and said feed screw, said feed screw engaging said first carriage when actuated toward said drum to impart axial motion thereto in a forward direction away from its initial starting position, second and third carriages adapted to traverse said drum axially in said forward direction when engaged by said first carriage, said second carriage being engaged by said first carriage during the playback of messages, said third carriage being engaged by said first carriage during the recording of a message and at a point corresponding to the end of the last recorded message, latching means for engaging said first and second carriages, first and second telephone lines connected to said home station, means responsive to a signal transmitted over a first conductor of said first line for energizing said driving means to rotate said drum and feed screw, means energized through said signal responsive means for actuating said first carriage to disengage it from said feed screw and for imparting axial motion thereto in a reverse direction toward said second carriage, a first switch on said second carriage adapted to be actuated by said first carriage traveling in said reverse direction, first means responsive to said actuated first switch for arresting the motion of and actuating said first carriage toward said drum to engage said feed screw, second means responsive to said actuated first switch for actuating said latching means to engage said first and second carriages, a second switch on said third carriage adapted to be actuated by said first carriage traveling in said forward direction, first means responsive to said actuated second switch for actuating said latching means to disengage said first and second carriages, second means responsive to said actuated second switch for deenergizing said driving means and arresting the motion of said first carriage, means responsive to a signal transmitted over said second line for reenergizing said driving means and conditioning said system for the recording of an additional message, means responsive to a signal transmitted over a second conductor of said first telephone line for conditioning said obliterating means to obliterate said messages.

15. In an automatic telephone answering and message recording system, a home station, distant stations, a device at said home station for storing telephone messages received from said distant stations, said device comprising a rotatable record drum, means for playing back said stored messages to a distant station, said means comprising a transducer supported on a first carriage adapted to traverse said drum axially and to be actuated toward and away from said drum, a feed screw, driving means for rotating said drum and said feed screw, said feed screw engaging said first carriage when actuated toward said drum to impart axial motion thereto in a forward direction away from its initial starting position, second and third carriages adapted to traverse said drum axially in said forward direction when engaged by said first carriage, said second carriage being engaged by said first carriage during the playback of messages, said third carriage being engaged by said first carriage at a point corresponding to the end of the last recorded message, latching means for engaging said first and second carriages, a telephone line connected to said home station, means responsive to a signal transmitted over a first conductor of said line for energizing said driving means to rotate said drum and feed screw, means energized through said signal responsive means for actuating said first carriage to disengage it from said feed screw and for imparting axial motion thereto in a reverse direction toward said second carriage, a first switch on said second carriage adapted to be actuated by said first carriage traveling in said reverse direction, first means responsive to said actuated first switch for arresting the motion of and actuating said first carriage toward said drum to engage said feed screw, second means responsive to said actuated first switch for actuating said latching means to engage said first and second carriages, means responsive to a disconnect condition established at said distant station for deenergizing said driving means, for actuating said latching means to disengage said first and second carriages, for actuating said first carriage to disengage it from said feed screw and for imparting axial motion to said first carriage in a forward direction toward said third carriage, a second switch on said third carriage adapted to be actuated by said first carriage traveling in said forward direction, means responsive to said actuated second switch for arresting the forward motion of said first carriage, means for obliterating said stored messages, means responsive to a signal transmitted over a second conductor of said telephone line for conditioning said obliterating means to obliterate said messages.

16. In an automatic telephone answering and message recording system, a home station, distant stations, a device at said home station for storing telephone messages received from said distant stations, said device comprising a rotatable record drum, means for recording said messages and playing back said messages to a distant station, means for obliterating said message, said recording and playback means comprising a transducer supported on a first carriage adapted to traverse said drum axially and to be actuated toward and away from said drum, a feed screw, driving means for rotating said drum and said feed screw, said feed screw engaging said first carriage when actuated toward said drum to impart axial motion thereto in a forward direction away from its initial starting position, second and third carriages adapted to traverse said drum axially in said forward direction when engaged by said first carriage, said second carriage being engaged by said first carriage during the playback of messages, said third carriage being engaged by said first carriage during the recording of a message and at a point corresponding to the end of the last recorded message, latching means for engaging said first and second carriages, first and second telephone lines connected to said home station, means responsive to a signal transmitted over a first conductor of said first line for energizing said driving means to rotate said drum and feed screw, means energized through said signal responsive means for actuating said first carriage to disengage it from said feed screw and for imparting axial motion thereto in a reverse direction toward said second carriage, a first switch on said second carriage adapted to be actuated by said first carriage traveling in said reverse direction, first means responsive to said actuated first switch for arresting the motion of and actuating said first carriage toward said drum to engage said feed screw, second means responsive to said actuated first switch for actuating said latching means to engage said first and second carriages, means responsive to a disconnect condition established at said distant station for deenergizing said driving means, for actuating said latching means to disengage said first and second carriages, for actuating said first carriage to disengage it from said feed screw and for imparting axial motion to said first carriage in a forward direction toward said third carriage, a second switch on said third carriage adapted to be actuated by said first carriage traveling in said forward direction, means responsive to said actuated second switch for arresting the forward motion of said first carriage, means responsive to a signal transmitted over said second line for reenergizing said driving means and conditioning said system for the recording of an additional message, means responsive to a signal transmitted over a second conductor of said first telephone line for conditioning said obliterating means to obliterate said messages and for returning said carriages to their initial starting positions.

17. An automatic telephone answering and message recording system in accordance with claim 16 wherein the peripheral surface of said record drum is magnetizable, said transducer is a magnetic recording and reproducing head and said obliterating means is a bulk demagnetizer comprising a pole-piece facing and extending across the peripheral surface of said record drum.

18. In an automatic telephone answering and message-recording system, a home station, distant stations, means at said home station for storing telephone messages received from said distant stations and playing back said stored messages to a distant station, said means comprising a record medium and a transducer for recording and reproducing said messages, a first carriage supporting said transducer, a second carriage for indexing the last previously reproduced message, said second carriage being engaged by said first carriage during the playback of messages, a telephone line connected to said home station, means responsive to a signal transmitted over said line for imparting motion to said first carriage in a reverse direction toward said second carriage, switch means adapted to be actuated when said first carriage comes in contact with said second carriage, means responsive to said actuated switch means for arresting the reverse motion of said first carriage, for latching said second carriage to said first carriage, for imparting forward motion to said first and second carriages and conditioning said transducer to reproduce said messages stored subsequent to said last previously reproduced message.

19. An automatic telephone answering and message-recording system in accordance with claim 18 wherein the point at which playback starts is the point at which said switch means is actuated, and said switch means is adjustable to control the distance traveled by said first carriage in a forward direction before said second carriage becomes latched thereto, thereby determining the portion of previously played back messages to be repeated prior to the playback of other messages.

References Cited in the file of this patent

UNITED STATES PATENTS

| | | |
|---|---|---|
| 2,769,033 | Waldman | Oct. 30, 1956 |
| 2,778,876 | Gordon | Jan. 22, 1957 |
| 2,784,254 | Lane | Mar. 5, 1957 |
| 2,835,737 | Shively | May 20, 1958 |

FOREIGN PATENTS

| | | |
|---|---|---|
| 733,436 | Great Britain | July 13, 1955 |